(12) United States Patent
Keller et al.

(10) Patent No.: US 10,528,143 B2
(45) Date of Patent: *__Jan. 7, 2020__

(54) FLUIDIC SWITCHING DEVICE WITH ELASTIC MATERIAL

(71) Applicant: FACEBOOK, INC., Menlo Park, CA (US)

(72) Inventors: Sean Jason Keller, Bellevue, WA (US); Tristan Thomas Trutna, Seattle, WA (US); Serol Turkyilmaz, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,755

(22) Filed: Jan. 30, 2019

(65) Prior Publication Data

US 2019/0339775 A1 Nov. 7, 2019

Related U.S. Application Data

(63) Continuation of application No. 15/973,252, filed on May 7, 2018, now Pat. No. 10,234,950.

(51) Int. Cl.
*G06F 3/01* (2006.01)
*F16K 31/12* (2006.01)

(52) U.S. Cl.
CPC .............. *G06F 3/016* (2013.01); *F16K 31/12* (2013.01)

(58) Field of Classification Search
CPC .................................. G06F 3/016; F16K 31/12
See application file for complete search history.

(56) References Cited

U.S. PATENT DOCUMENTS

| | | | | |
|---|---|---|---|---|
| 2002/0081218 A1* | 6/2002 | Sharma | .................. | F04B 43/043 417/322 |
| 2002/0099453 A1* | 7/2002 | Tokimoto | ............... | G05G 9/047 700/17 |
| 2010/0135826 A1* | 6/2010 | Higashino | ............. | F04B 43/043 417/244 |
| 2012/0114849 A1* | 5/2012 | Melcher | .................. | B05B 12/14 427/201 |
| 2014/0010735 A1* | 1/2014 | Tanaka | ................ | B01L 3/50273 422/504 |
| 2014/0150945 A1* | 6/2014 | Kumar | .................... | B60C 23/12 152/450 |
| 2015/0166228 A1* | 6/2015 | Aljajawi | ................ | B65D 51/16 220/203.28 |
| 2016/0299602 A1* | 10/2016 | Shuster | .................... | H04L 67/10 |

OTHER PUBLICATIONS

Keller, Notice of Allowance, U.S. Appl. No. 15/973,252, dated Nov. 30, 2018, 9 pgs.

* cited by examiner

*Primary Examiner* — Nay Tun
(74) *Attorney, Agent, or Firm* — Morgan, Lewis & Bockius LLP

(57) ABSTRACT

A fluidic switch (or fluidic device) is provided. The fluidic switch includes: (i) a housing defining a cavity with a first opening and a second opening, the second opening being larger than the first opening, the cavity containing an elastic substance, (ii) a channel to transport a fluid from a source, across the first opening, to a drain, where the first opening opens into the channel, and (iii) an actuator to apply a force through the second opening to the elastic substance in the cavity when actuated, the force to displace a portion of the elastic substance into the channel to impede transport of the fluid through the channel.

20 Claims, 16 Drawing Sheets

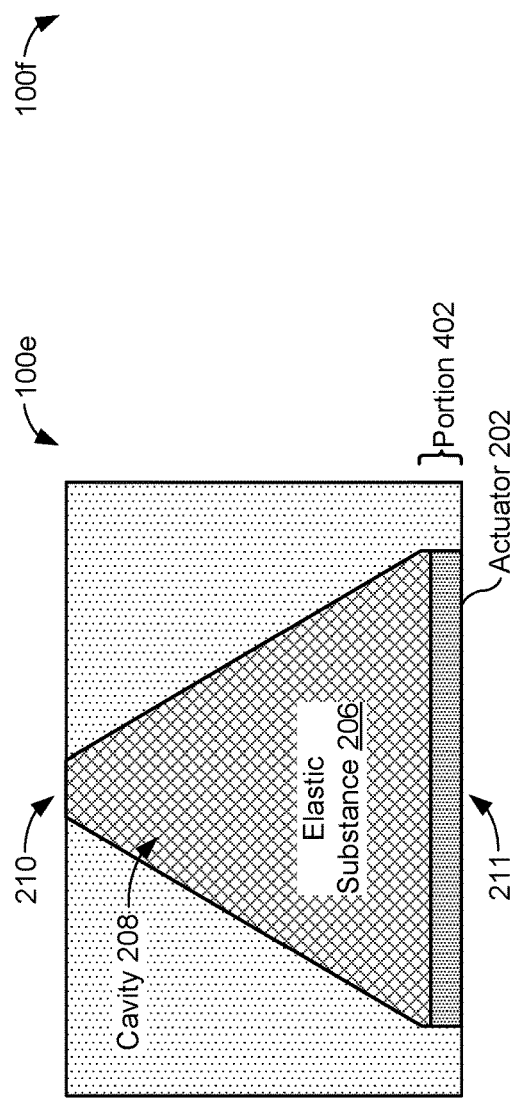
Figure 4A
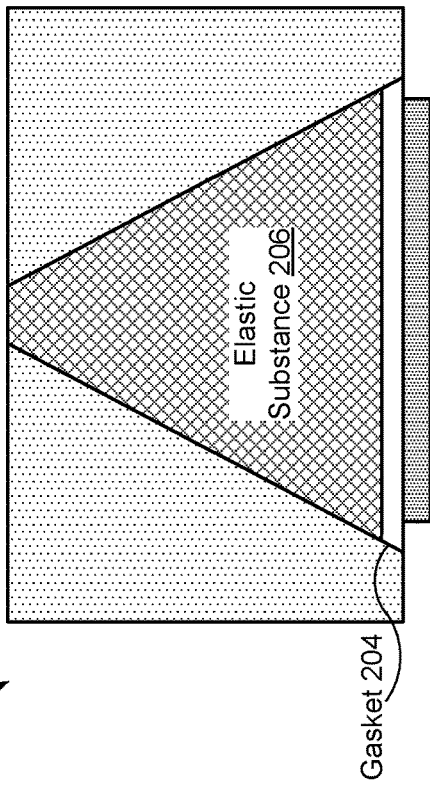
Figure 4B
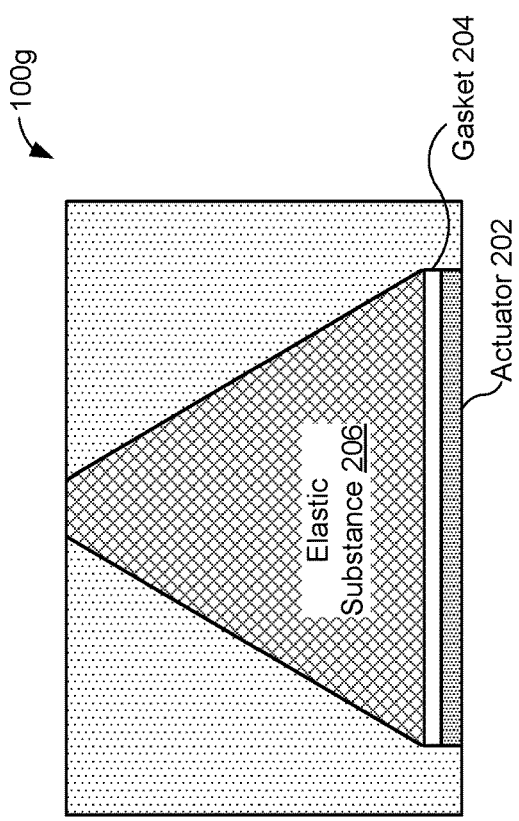
Figure 4C
Figure 4D

FLUIDIC SWITCHING DEVICE WITH ELASTIC MATERIAL

CROSS REFERENCE TO RELATED APPLICATIONS

This application is a continuation of U.S. patent application Ser. No. 15/973,252, filed May 7, 2018, entitled "Fluidic Switching Device with Viscoelastic Material," which is incorporated by reference herein in its entirety.

TECHNICAL FIELD

The present disclosure generally relates to fluidic devices, and more specifically to fluidic switching devices for use in virtual reality, augmented reality, and/or mixed reality systems.

BACKGROUND

Virtual and augmented reality devices have wide applications in various fields, including engineering design, medical surgery practice, military simulated practice, video gaming, etc. Some wearable devices, such as a glove, allow users to interact with virtual objects. However, circuitry on such wearable devices can be complex, bulky, and in some cases heavy. As a result, conventional wearable devices can detract from a user's experience with a VR and/or AR system.

SUMMARY

Accordingly, there is a need for devices that reduce the size of the circuitry included in wearable devices. One solution is a wearable device that incorporates fluidic switches to reduce the size of the circuitry included in the wearable device. Fluidic switches are fluid handling devices that function analogous to electronic devices (e.g., an electrical transistor, an electrical diode, a resistor, a capacitor, etc.). Fluidic switches may be designed to operate as fluidic transistors. Additionally, multiple fluidic switches may be coupled together to form a composite fluidic device (e.g., a decoder). In some embodiments, groups of fluidic devices are coupled together to act as controllers for haptic apparatuses on wearable devices (e.g., haptic gloves) for use in a VR system, an AR system, and/or a mixed reality system.

In some embodiments, an exemplary fluidic device (also referred to herein as a fluidic switch or fluidic switching device) includes: (i) a housing defining a cavity with a first opening and a second opening, the second opening being larger than the first opening, the cavity containing an elastic substance, (ii) a channel to transport a fluid from a source, across the first opening, to a drain, wherein the first opening opens into the channel, and (iii) an actuator to apply a force through the second opening to the elastic substance in the cavity when actuated, the force to displace a portion of the elastic substance into the channel to impede transport of the fluid through the channel. For example, as shown in FIGS. 7A-7B, an elastic substance 206 is compressed by an actuator 202, and as a result, a portion 709 of the elastic substance 206 is displaced into the channel 702. In doing so, the elastic substance 206 impedes transport of the fluid 708 through the channel 702 (e.g., the fluid 708 can no longer reach the drain 706).

In some embodiments, the fluidic switch described above can be implemented on a device that includes a plurality of fluidic switches. The device in some instances is worn on the user's body (e.g., a glove worn on the hand) and can be used to stimulate areas of the body (e.g., provide haptic feedback to a user). Moreover, the device can be in communication with a remote device (e.g., a virtual reality device and/or an augmented reality device, among others), and the device can stimulate the body based on an instruction from the remote device. As an example, the remote device may display video data to a user (e.g., via a head-mounted display), and the remote device may instruct the device to create haptic stimulations that correspond to the images displayed to the user. To create the various haptic stimulations, the plurality of fluidic switches may be used to control when and where a user feels a respective haptic stimulation.

In accordance with some embodiments, a method is performed. The method includes providing a fluidic switch that comprises: (i) a housing defining a cavity with a first opening and a second opening, the second opening being larger than the first opening, the cavity containing an elastic substance, (ii) a channel that transports a fluid across the first opening, wherein the first opening opens into the channel, and (iii) an actuator. The method further includes causing the fluid to flow through the channel, and while the fluid is flowing, applying, via the actuator, a force to the elastic substance in the cavity.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 4A-4D are cross-sectional views of a fluidic switch in accordance with some embodiments (taken along line $A^1$-$A^2$, FIG. 2B).

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to obscure aspects of the embodiments unnecessarily.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
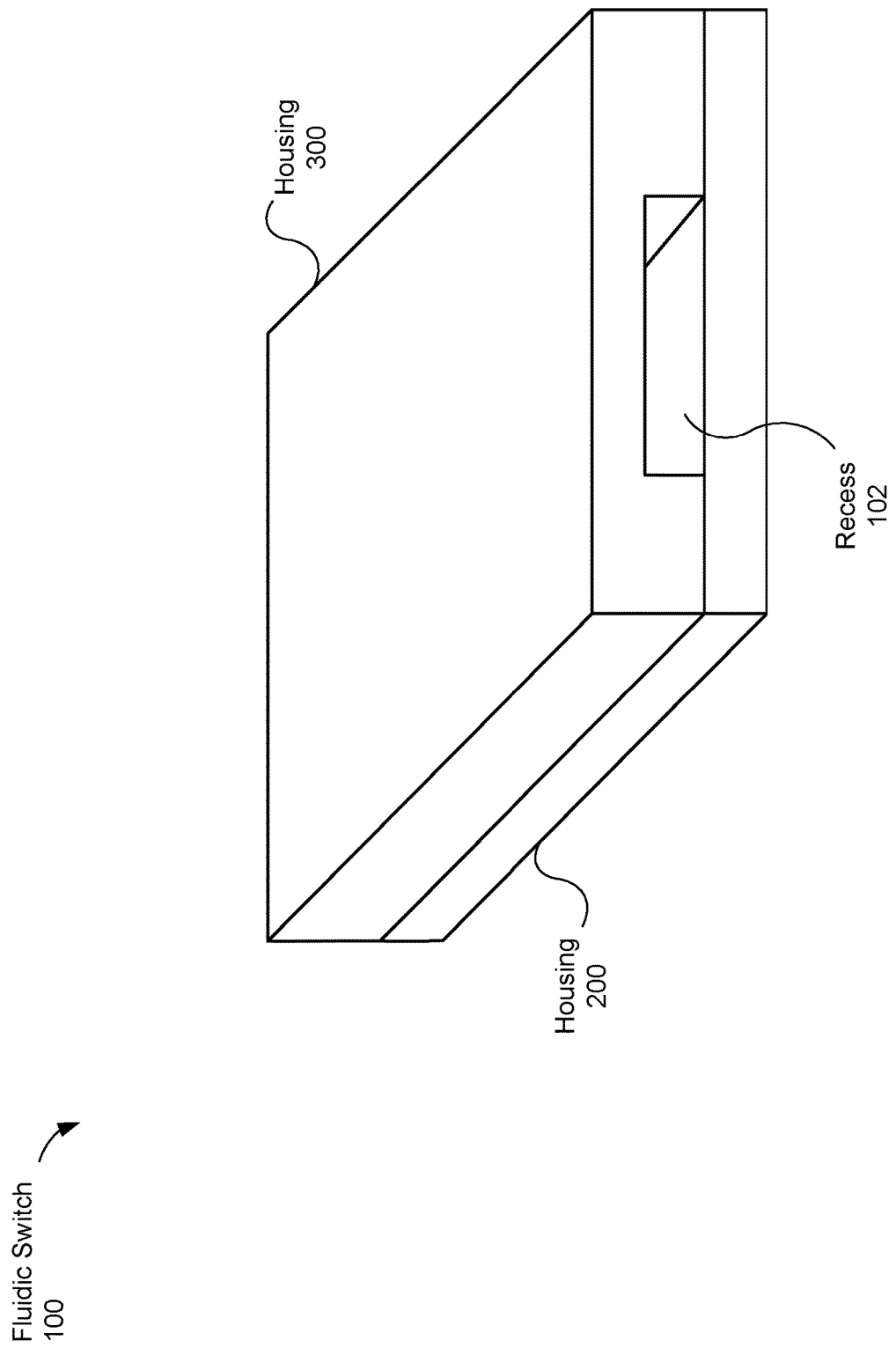
FIG. 1 is an oblique view of a fluidic switch in accordance with some embodiments.

FIG. 1 is an oblique view of an example fluidic switch 100 in accordance with some embodiments. The fluidic switch 100 (or fluidic device) is a fluid handling device that functions analogous to electronic devices (e.g., an electrical transistor, an electrical diode, a resistor, a capacitor, etc.). The fluidic switch 100 can be used in virtual reality (VR) systems, augmented reality (AR) systems, mixed reality (MR) systems, and various other systems. The fluidic switch 100 functions in a manner similar to conventional electrical transistors such that gate pressure may adjust a flow of a liquid through a channel from a source to a drain.

Additionally, in some embodiments, the fluidic switch 100 is one of plurality of fluidic switches that are "composable," in that a plurality of fluidic devices may be coupled together. As a single fluidic switch 100 may be designed to operate as, e.g., a fluidic transistor, multiple switches can be coupled together to create a composite device that performs certain logical functions in a manner analogous to electrical transistors being used together to form electrical circuits that perform logical functions. Accordingly, a composite fluidic device may perform various logic functions including, e.g., an AND function, a NOT function, a NAND function, an OR function, a NOR function, an exclusive OR function, some other logical function, or some combination thereof. Moreover, multiple composite switches/devices can be coupled together to form even larger fluidic circuits (e.g., a decoder, a controller in a haptic device, etc.). The composite fluidic device may be structured to perform combination logic, sequential logic, or both, or it may be configured to pass values (e.g. a pass transistor or a pass-gate).

The fluidic switch 100 shown in FIG. 1 includes a first housing 200 and a second housing 300. The first and second housings 200, 300 may be formed of plastic, glass, ceramics, fiber composites, metal (e.g., stainless steel, aluminum, etc.), other suitable materials, or a combination of any two or more of these materials. Additionally, depending on the material choice, the first and second housings 200, 300 may be rigid, semi-rigid, flexible, or some combination thereof. For example, the first housing 200 may be rigid while the second housing 300 may be flexible, or some other combination. In some embodiments, the first and second housings 200, 300 are mechanically (e.g., using mechanical fasteners) and/or chemically (e.g., using an epoxy) attached to one another (i.e., the first and second housings are distinct pieces). In some embodiments, the housings 200 and 300 may be formed using a unibody configuration in which some or all of the housings is machined or molded as a single structure (i.e., the first and second housings 200, 300 are a single housing). Although the fluidic switch 100 (and the first and second housings 200, 300) is shown as rectangular, the fluidic switch 100 may be various shapes (e.g., circular, triangular, etc.). In addition, an overall size of the fluidic switch 100 may vary depending on the application (e.g., the fluidic switch 100 may have a first size for a first application and may have a second size that differs from the first size for a second application). Thus, in some circumstances, the first housing 200 is thicker than the second housing 300, and in some other circumstances the first housing 200 is thinner than the second housing 300. In some embodiments, the second housing 300 is a layer of material deposited on the first housing 200.

Figure 9:
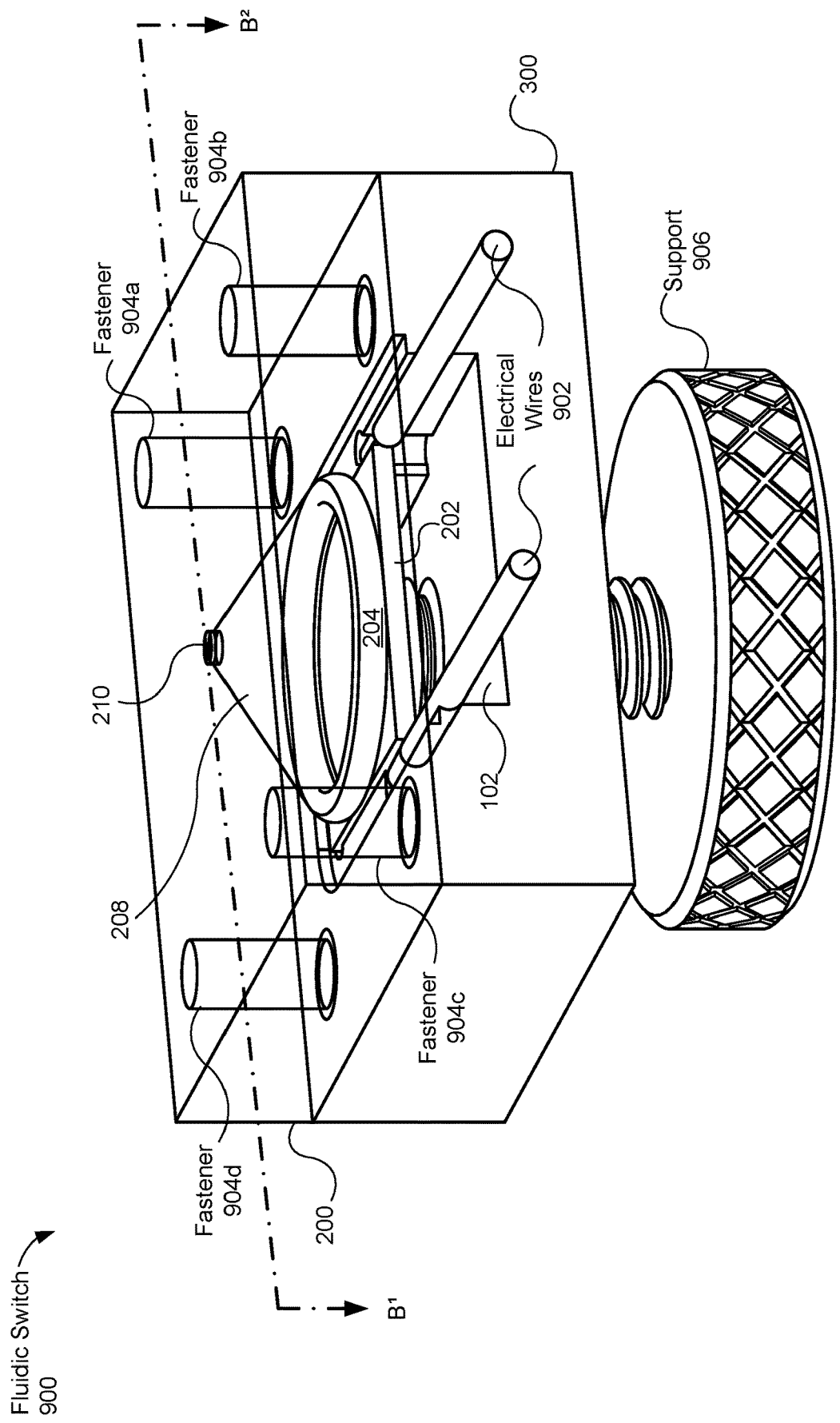
FIG. 9 illustrate an example fluidic switch in accordance with some embodiments

The fluidic switch 100 also includes a recess 102 formed into the first housing 200 and/or the second housing 300 (shown as being formed into the second housing 300). The recess 102 creates a pathway from an exterior of the fluidic switch 100 to an interior of the fluidic switch 100. In some embodiments, the recess 102 is configured to accommodate electrical wires (e.g., electrical wires 902, FIG. 9) that are connected to an external device (e.g., one or more processors 1370, FIG. 13). Further, the electrical wires may be coupled to an actuator (e.g., as shown in FIG. 9) housed in the fluidic switch 100, and the electrical wires may be configured to provide electrical signals to the actuator. As discussed below, the electrical signals from the wires cause the actuator to actuate (e.g., increase in size in at least one dimension), and actuation of the actuator transitions the fluidic switch 100 from a first state (e.g., an open state) to a second state (e.g., a closed state), or vice versa. The recess 102 and the second housing 300 are discussed in further detail below with reference to FIGS. 9-11.

Although not shown in FIG. 1, the fluidic device 100 also includes a channel that is at least partially attached to the fluidic device 100. The channel transports a fluid (e.g., a liquid or gas) from a source, across an opening in the first housing 200, to a drain. Accordingly, the "open" state of the channel refers to a state when the fluid in the channel is flowing from one end (e.g., the source) to the other end (e.g., the drain) at some open threshold rate. For example, the open threshold rate may be 10 cc/s (or some lesser or greater rate). The measurement "cc/s" used throughout the specification refers to "cubic-cm/sec." In contrast, the "closed" state of the channel refers to the state when the flow of fluid in the channel is less than some closed threshold rate. In some embodiments, the closed threshold rate may be zero flow. Alternatively, the closed threshold rate may be some rate of flow that is lower than the open threshold rate. For example, the closed threshold rate may be approximately 0.1 cc/s (or some lesser or greater rate). In addition, a "transitionary" state occurs when the channel transitions from an open state to a closed state or from a closed state to an open state. The "open" state of the channel is also referred to as an "ON" condition of the fluidic device 100, and the "closed" state of the channel is also referred to as an "OFF" condition of the fluidic device 100, or vice versa. In some circumstances, the "open" state may represent a "1" and the "closed" state may represent a "0," or vice versa. Thus, in these circumstances, the fluidic switch 100 may operate digitally. In some embodiments, the range of response times for the channel to transition from the open state to the closed state (or vice versa) can range from approximately 0.1 ms to 30 ms. The channel of the fluidic device 100 is discussed in further detail below with reference to FIGS. 7A-7B and FIG. 8.

Figure 2A:
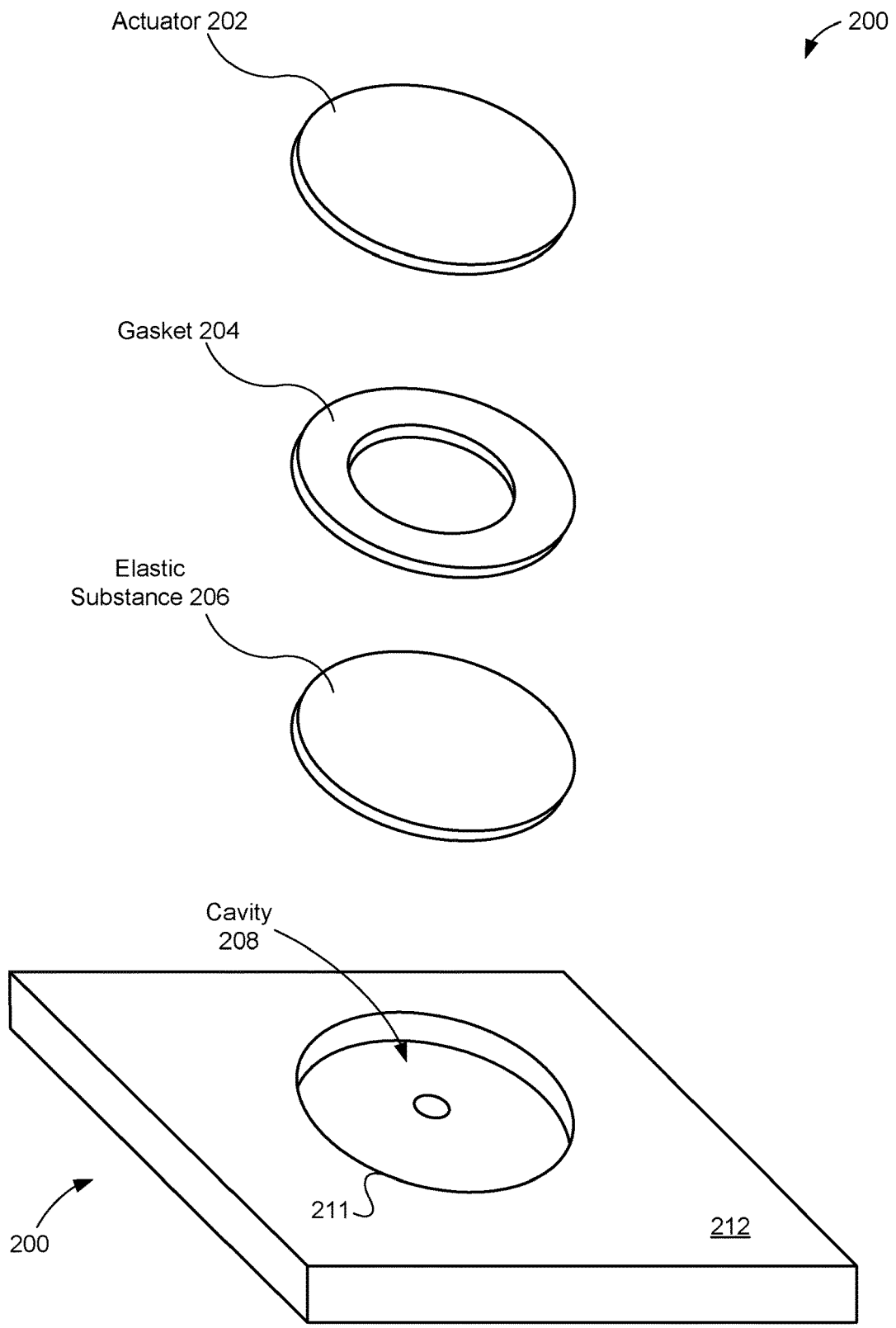
FIG. 2A is an oblique view of a fluidic switch, or a portion of the fluidic switch illustrated in FIG. 1 in accordance with some embodiments.

FIG. 2A is an exploded view of the fluidic device 100 in accordance with some embodiments. The components in FIG. 2A are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein. To that end, as a non-limiting example, the fluidic device 100 includes the first housing 200 (discussed above with reference to FIG. 1), an actuator 202, a gasket 204 (optional), and an elastic substance 206. The second housing 300 is not included in FIG. 2A for ease of illustration and discussion.

As discussed above, the first housing 200 made be formed of plastic, glass, ceramics, fiber composites, metal (e.g., stainless steel, aluminum, etc.), other suitable materials, or a combination of any two or more of these materials. Additionally, depending on the material choice, the first housing 200 may be rigid, semi-rigid, flexible, or a combination thereof. The first housing 200 includes a first surface 212 that defines a cavity 208, and the cavity 208 (i.e., a chamber) includes an opening 211, which is defined by the first surface 212 of the first housing 200, and another opening 210, which is defined by a second surface 214 of the first housing 200, and shown in FIG. 2C. The first housing 200 may also be referred to as substrate 200.

The elastic substance 206 is disposed within the cavity 208. In some embodiments, the elastic substance is viscoelastic. As the name implies, "viscoelastic" materials are materials that exhibit both viscous and elastic characteristics when undergoing deformation, as known by those skilled in the art. When a force is applied to the elastic substance 206, the elastic substance 206 deforms. However, once the force is no longer applied, the elastic substance 206 returns to its pre-force shape/configuration (assuming the force does not exceed a threshold). The elastic substance 206 may be an elastic or viscoelastic polymer, or any other material or substance classified as being "elastic." The elastic substance 206 is configured to remain within the cavity 208 when no force is applied and configured to exit (partially) the cavity 208 through the opening 210 when a force is applied. The elastic substance 206 is discussed in further detail below with reference to FIGS. 3A-7B.

In some embodiments, the substance 206 is an elastic substance 206. The substance 206 can be any incompressible fluid, as long as the opening 210 (and the optional gasket 204) is stretchable and does not allow the substance 206 to leak out of the cavity 208.

The optional gasket 204 may be in contact with the elastic substance 206. In some embodiments, the gasket 204 is also disposed within the cavity 208. Alternatively, in some embodiments, the gasket 204 is disposed adjacent to the cavity 208. In either case, the gasket 204 and the elastic substance 206 may be coaxial. The gasket 204 is configured to seal the opening 211 of the cavity 208 (i.e., the gasket 204 prevents the elastic substance 206 from exiting the cavity 208 through the opening 211). By sealing the opening 211, the elastic substance 206 is only able to exit the cavity 208 through the opening 210. The gasket 204 may be made from a polymer, such as rubber, or any other suitable material known by those skilled in the art. In some embodiments, the gasket 204 is a planar piece of material while in other embodiments the gasket 204 is annular (e.g., torus shaped, such as an O-ring). Various examples of the gasket's 204 location are shown in FIGS. 3A-4D.

Figures 5A, 5B:
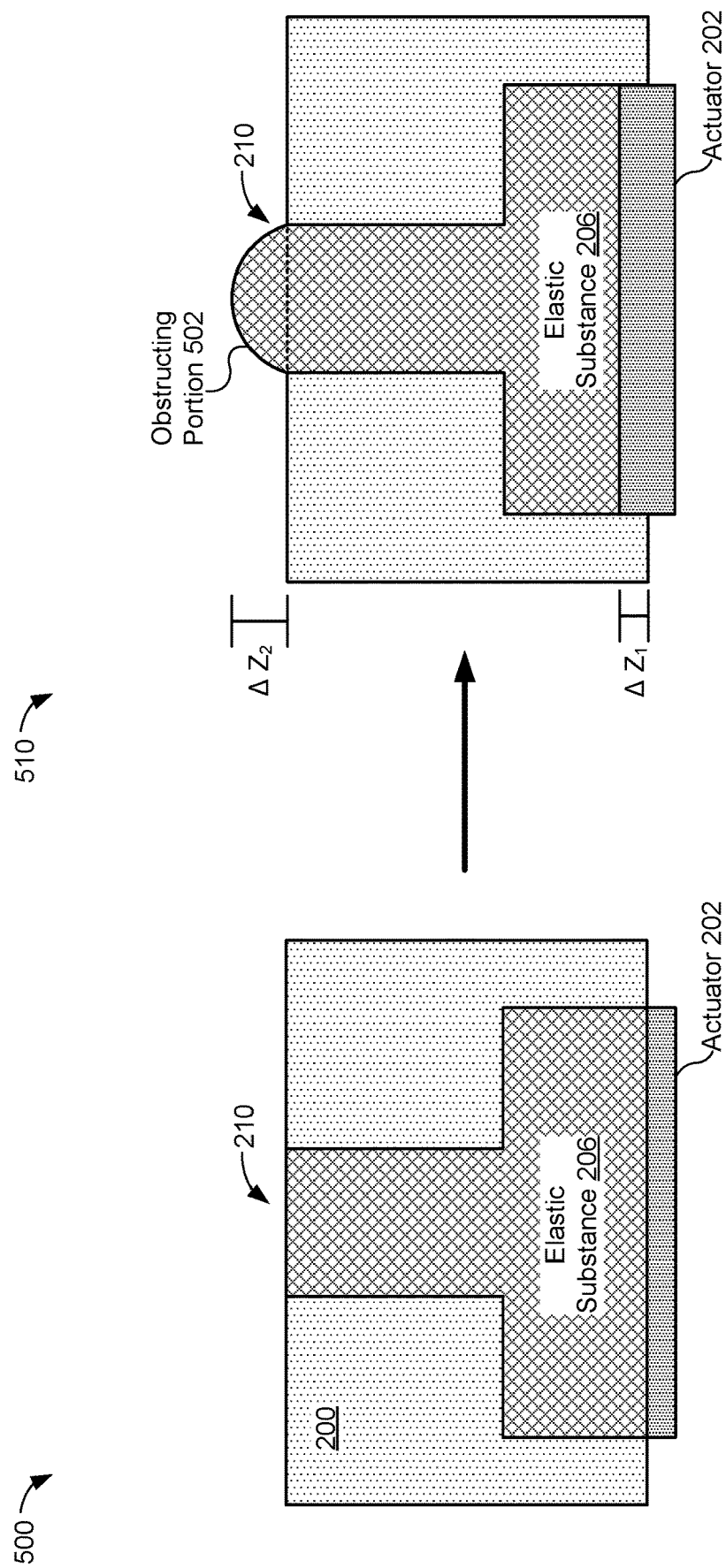
FIGS. 5A and 5B illustrate actuation of the actuator included in the fluidic switch in accordance with some embodiments.
Figure 6B:
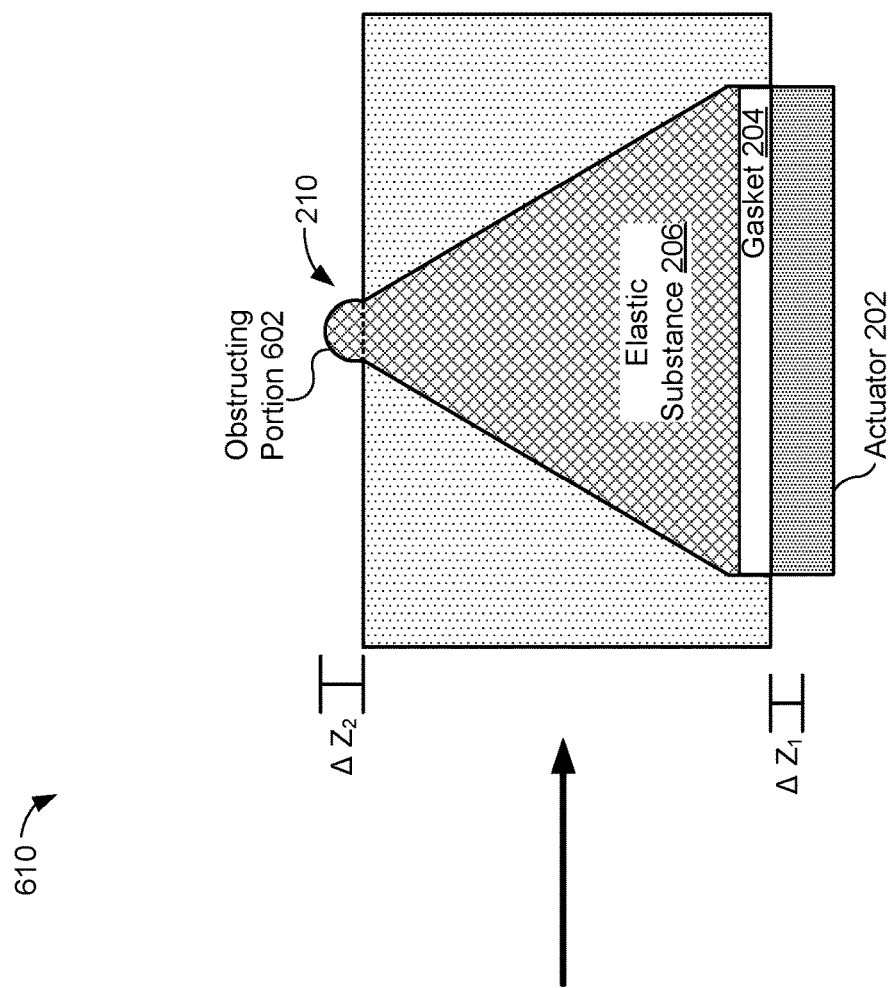
FIGS. 6A and 6B illustrate actuation of the actuator included in the fluidic switch in accordance with some embodiments.

The actuator 202 either directly contacts or indirectly contacts the elastic substance 206. For example, in those embodiments where the gasket 204 is not included, the actuator 202 directly contacts the elastic substance 206. Alternatively, in those embodiments where the gasket 204 is included, the actuator 202 directly contacts the gasket 204. The actuator 202 is configured to apply a force to the elastic substance 206 when actuated. In some embodiments, the force is applied directly to the elastic substance 206 (e.g., when the gasket 204 is not included) or the force is applied to the elastic substance 206 by applying the force to the gasket 204. In either case, the applied force causes a portion of the elastic substance 206 to exit the cavity 208 through the opening 210 (e.g., as shown in FIGS. 5B, 6B, and 7B). In some embodiments, the actuator 202 is piezoelectric. In some embodiments, a single piezoelectric layer (or cell) composes the actuator 202, whereas in other embodiments multiple piezoelectric layers (or cells) compose the actuator 202. One skilled in the art will appreciate that the actuator 202 may have any number of piezoelectric configurations. In addition, the actuator 202 may be disk shaped (although other three-dimensional shapes are possible). The actuator 202 may be any actuator with sufficient displacement and blocking force to achieve the desired performance discussed below (e.g., step 1206, FIG. 12).

In some embodiments, a depth of the cavity 208 is such that only the elastic substance 206 is disposed within the cavity 208. Alternatively, in some embodiments, a depth of the cavity 208 is such that the elastic substance 206 and the gasket 204 are disposed within the cavity 208. Alternatively, in some embodiments, a depth of the cavity 208 is such that the elastic substance 206, the gasket 204, and the actuator 202 are disposed within the cavity 208.

Figure 2B:
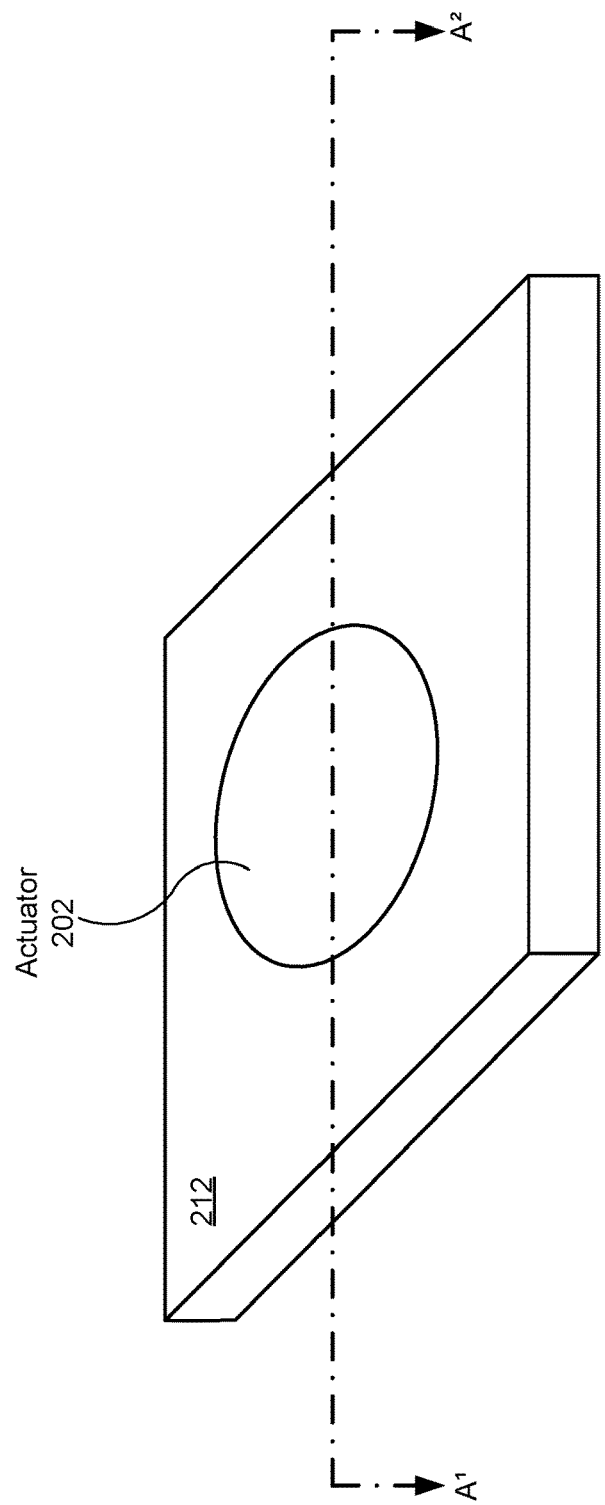
FIG. 2B is an exploded view of the fluidic switch shown in FIG. 2A in accordance with some embodiments.

FIG. 2B is an oblique view of the first housing 200 discussed above with reference to FIG. 1, in accordance with some embodiments. The second housing 300 is not included in FIG. 2B for ease of illustration and discussion. In this example, at least the elastic substance 206 and the actuator 202 are disposed within the cavity 208. Additionally, the gasket 204 may also be disposed within the cavity 208. In some embodiments, a diameter of the actuator 202 is substantially the same as a diameter of the opening 211. Alternatively, in some embodiments, a diameter of the actuator 202 is less than a diameter of the opening 211.

Figure 2C:
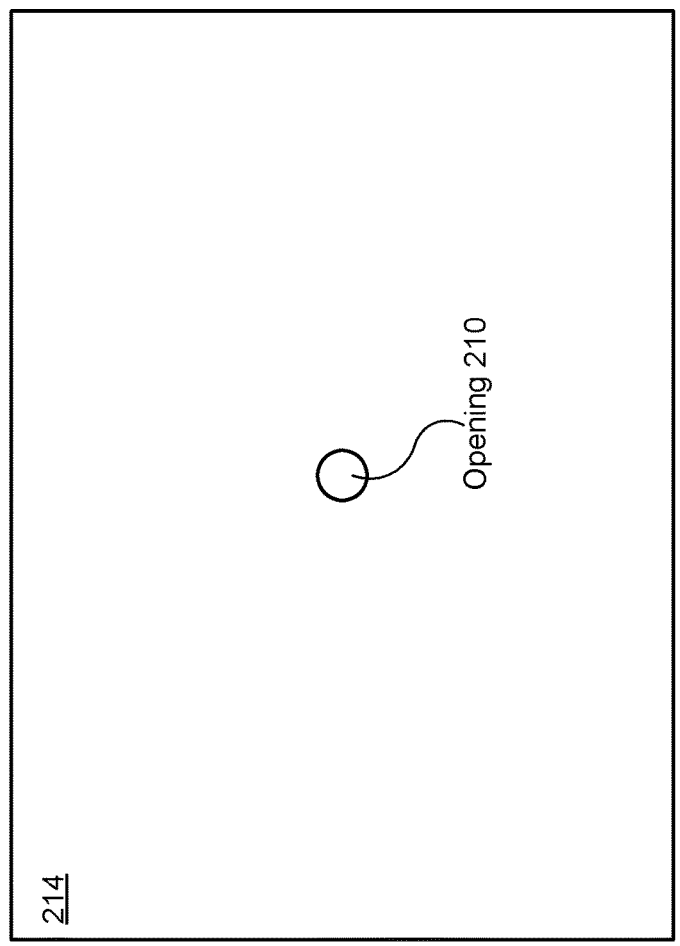
FIG. 2C is a top view of the fluidic switch shown in FIG. 2A in accordance with some embodiments.

FIG. 2C is a top view of the first housing 200, in accordance with some embodiments. As shown, the second surface 214 of the first housing 200 defines the opening 210. The opening 210 has a diameter that is less than a diameter of the opening 211. In some embodiments, the diameter of the opening 210 is selected based on characteristics of the elastic substance 206. For example, the opening 210 may have a first diameter when the elastic substance 206 has a first material composition and the opening 210 may have a second diameter when the elastic substance 206 has a second material composition (e.g., a highly viscous material may need a larger opening to flow through the opening 210, due to internal and external frictional forces). In some embodiments, a relationship between a diameter of the opening 210 and a viscosity of the elastic substance 206 may be proportional.

The opening 210 in FIG. 2C is circular and centered on the housing 200. However, the opening 210 may have various shapes and sizes, and be formed through the housing 200 where needed. Thus, the arrangement and configuration of the opening 210 in FIG. 2C is merely one possible arrangement and configuration.

Figure 10:
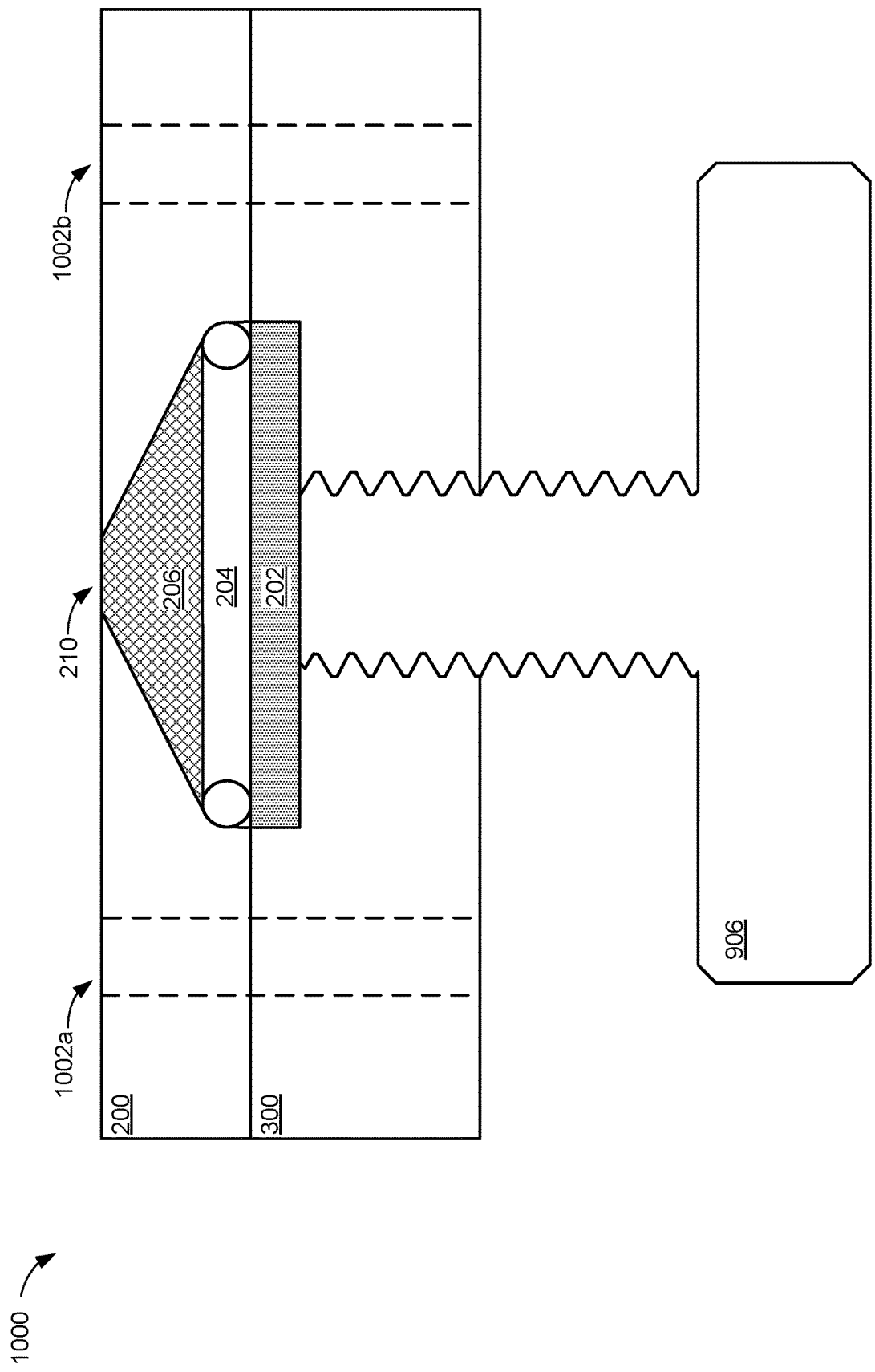
FIG. 10 is a cross-section view of a fluidic switch in accordance with some embodiments (taken along $B^1$-$B^2$, FIG. 9).

FIGS. 3A-3D are cross-sectional views of a fluidic switch, in accordance with some embodiments (taken along line $A^1$-$A^2$, FIG. 2B). In the cross-sectional views shown in FIGS. 3A-3D, various instances 100a-100d of the fluidic switch 100 are illustrated, with each instance including the first housing 200, the cavity 208, and the elastic substance 206 disposed in the cavity 208. The cavity 208 in each instance 100a-100d has a lower portion 302 and an upper portion 304 (two portions separated by dotted line in FIG. 3A). The lower portion 302 has a diameter that is larger than a diameter of the upper portion 304. The diameter of the lower portion 302 may correspond to a diameter of the opening 211 and the diameter of the upper portion 304 may correspond to a diameter of the opening 210. Each instance 100a-100d shows a different arrangement of the actuator 202, and in some cases the gasket 204. Moreover, although not shown for ease of illustration and discussion, the second housing 300 parallels and contacts the first surface 212 of the first housing 200 (e.g., the second housing 300 is opposite the first surface 212 and the actuator 202 in FIG. 3A, as shown in FIGS. 9 and 10). Lastly, the cross-sectional views shown in FIGS. 3A-3D do not illustrate actuation of the actuator 202. Cross-sectional views in FIGS. 5A-5B and 6A-6B illustrate actuation of the actuator 202.

Figure 3A:
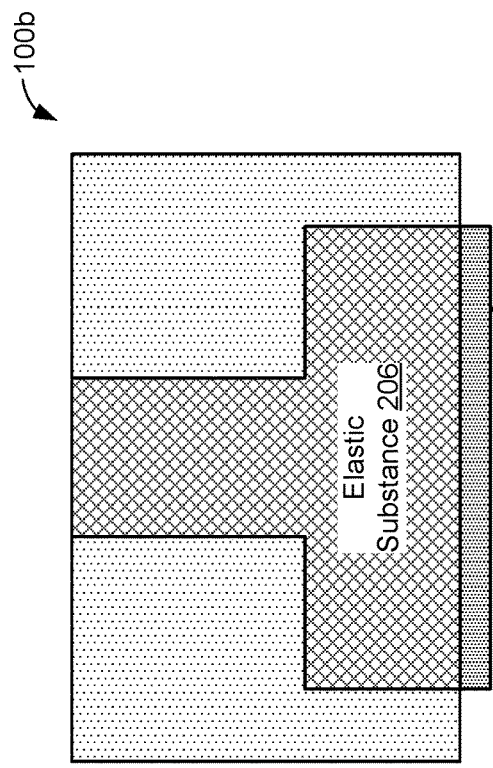
FIGS. 3A-3D are cross-sectional views of a fluidic switch in accordance with some embodiments (taken along line $A^1$-$A^2$, FIG. 2B).
Figure 3B:
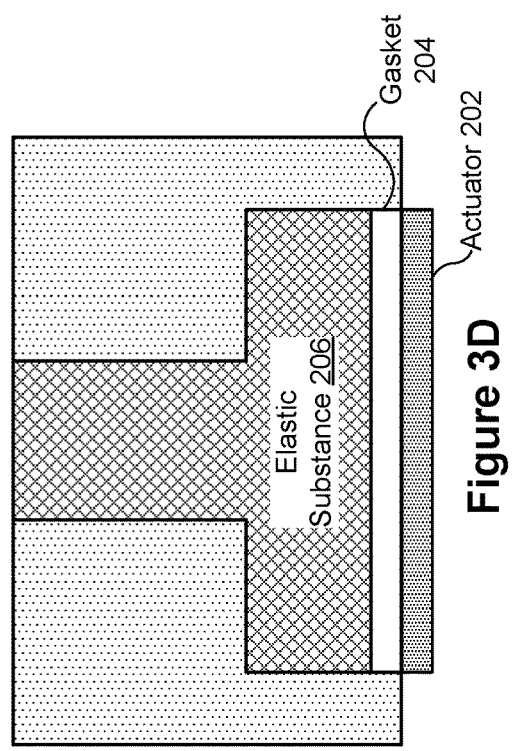
Figure 3C:
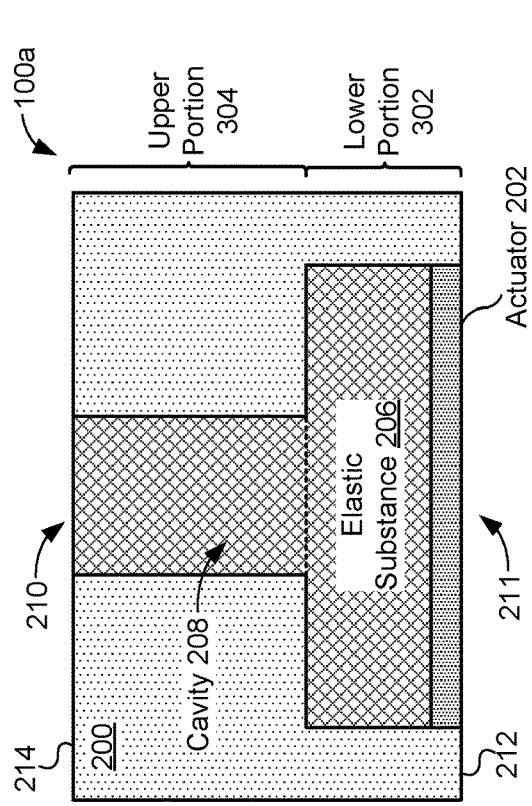
Figure 3D:
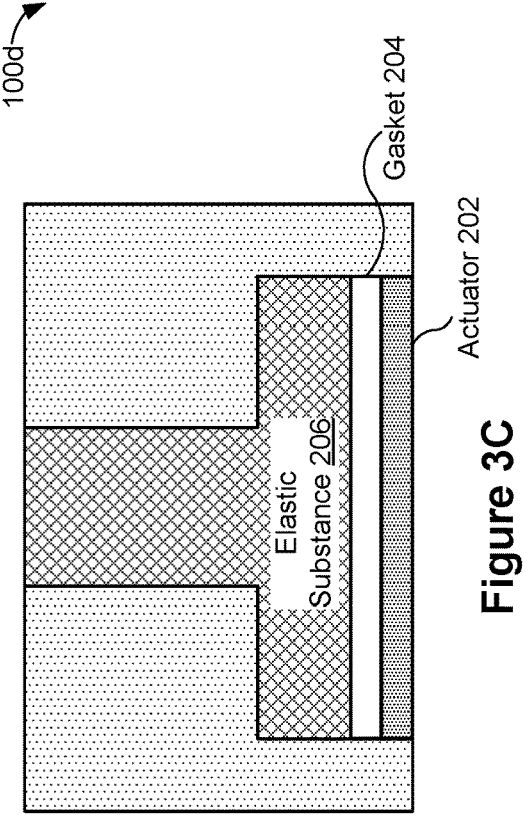

For ease of discussion below, the actuator 202 is referred to as having a "top surface" and a "bottom surface." The "top surface" refers to a surface of the actuator 202 that is either contacting the elastic substance 206 (as shown in FIGS. 3A and 3B) or the gasket 204 (as shown in FIGS. 3C and 3D). The "bottom surface" refers to a surface of the actuator 202 that is opposite the "top surface." The gasket 204 is also referred to as having a "top surface" and a "bottom surface." The "top surface" refers to a surface of the gasket 204 contacting the elastic substance 206 (as shown in FIGS. 3C and 3D) and the "bottom surface" refers to a surface of the gasket 204 that is opposite the "top surface." The classification of "top" and "bottom" is not meant to be limiting and is simply used to differentiate two surfaces.

In FIG. 3A, the elastic substance 206 and the actuator 202 are disposed in the cavity 208. In this arrangement, the cavity 208 houses the actuator 202, meaning that a bottom surface of the actuator 202 and the first surface 212 of the first housing 200 are co-planar (or substantially co-planar). In addition, in some embodiments, the actuator 202 and the opening 211 are substantially concentric with one another. Thus, in this arrangement, the actuator 202 may be flush with the first surface 212 and the opening 211.

In FIG. 3B, the actuator 202 is not disposed in the cavity 208 (e.g., the elastic substance 206 substantially fills the cavity 206, thereby leaving no room in the cavity 208 for the actuator 202). Instead, the actuator 202 is adjacent and parallel to the cavity 206. More specifically, the actuator 202 is vertically offset from the cavity 208, meaning that (i) a top surface of the actuator 202 and the first surface 212 of the first housing 200 are co-planar (or substantially co-planar), and (ii) a bottom surface of the actuator 202 is vertically offset from the first surface 212 of the first housing 200. Thus, in this arrangement, the actuator 202 is not flush with the first surface 212. In some embodiments, the actuator 202 and the opening 211 are substantially concentric with one another.

In some embodiments (not shown), the actuator 202 is partially disposed in the cavity 208. In this arrangement, the actuator 202 is not flush with the first surface 212 of the first housing 200, and is instead a hybrid of what is shown in FIGS. 3A and 3B.

In FIG. 3C, the elastic substance 206, the gasket 204, and the actuator 202 are disposed in the cavity 208. In this arrangement, the gasket 204 is sandwiched between the elastic substance 206 and the actuator 202. Moreover, the cavity 208 houses the gasket 204 and the actuator 202, and the bottom surface of the actuator 202 and the first surface 212 of the first housing 200 are co-planar (or substantially co-planar).

In FIG. 3D, the gasket 204 is disposed in the cavity 208 while the actuator 202 is not disposed in the cavity 208. In this arrangement, the cavity 208 houses the elastic substance 206 and the gasket 204, meaning that a bottom surface of the gasket 204 and the first surface 212 of the first housing 200 are co-planar (or substantially co-planar). Moreover, the actuator 202 is adjacent and parallel to the cavity 206. More specifically, the actuator 202 is vertically offset from the cavity 208, meaning that (i) a top surface of the actuator 202 and the first surface 212 of the first housing 200 are co-planar (or substantially co-planar), and (ii) a bottom surface of the actuator 202 is vertically offset from the first surface 212 of the first housing 200. Thus, in this arrangement, the gasket 204 is flush with the first surface 212 while the actuator 202 is not flush with the first surface 212.

In some embodiments (not shown), the actuator 202 and the gasket 204 are not disposed in the cavity 208. Instead, the gasket 204 is vertically offset from the cavity 208, meaning that (i) a top surface of the gasket 204 and the first surface 212 of the first housing 200 are co-planar (or substantially co-planar), and (ii) a bottom surface of the gasket 204 is vertically offset from the first surface 212 of the first housing 200. Moreover, the actuator 202 is also vertically offset from the cavity 208. Thus, in this arrangement, the gasket 204 and the actuator 202 are not flush with the first surface 212. In this arrangement, when the actuator 202 is actuated, the gasket 204 may be forced into the cavity 208 by the actuator 202. Accordingly, in one state, the gasket 204 is not flush with the cavity 208 while in another state the gasket 204 may be flush (or close to flush) with the cavity 208.

In some embodiments, the actuator 202, the gasket 204, and the opening 211 are substantially concentric with one another. Alternatively, in some embodiments, the gasket 204 and the opening 211 are substantially concentric with one another while the actuator 202 is not concentric with the gasket 204 and the opening 211. Moreover, a diameter of the actuator 202 may be less than a diameter of the gasket 204 and the opening 211.

As explained above, the cavity 208 in each instance 100a-100d has a lower portion 302 and an upper portion 304 (two portions separated by dotted line in FIG. 3A). The upper portion 304 and/or the lower portion 302 may have various shapes and sizes, and the shapes and sizes shown in FIGS. 3A-3D are not meant to be limiting. For example, the upper portion 304 and/or the lower portion 302 may have slanted walls, as opposed to the vertical walls shown in FIGS. 3A-3D. Additionally, respective sizes of the upper portion 304 and the lower portion 302 may be adjusted as needed. Moreover, the openings 210 and 211 are shown as being on opposing surfaces 212 and 214 of the first housing 200. However, in some embodiments, the openings 210 and 211 are not on opposing surfaces of the first housing 200 (e.g., the openings 210 and 211 may be on adjacent surfaces of the first housing 200).

FIGS. 4A-4D are cross-sectional views of a fluidic switch, in accordance with some embodiments (taken along line $A^1$-$A^2$, FIG. 2B). In the cross-sectional views shown in FIGS. 4A-4D, various instances 100e-100h of the fluidic switch 100 are illustrated, with each instance including the first housing 200, the cavity 208, and the elastic substance 206 disposed in the cavity 208. The cavity 208 in each instance 100e-100h is substantially frustoconical (FIGS. 4A-4C) or frustoconical (FIG. 4D). In FIGS. 4A-4C the cavity 208 is deemed "substantially frustoconical" because a portion 402 of the cavity 208 has vertical walls, while the remainder of the cavity 208 has slanted walls. The portion 402 is sized to accommodate the actuator 202 and/or the gasket 204, depending on the circumstance.

Each instance 100e-100h shows a different arrangement of the actuator 202, and in some cases the gasket 204. Moreover, although not shown for ease of illustration and discussion, the second housing 300 parallels and contacts the first surface 212 of the first housing 200 (e.g., the second housing 300 is opposite the first surface 212 and the actuator 202 in FIG. 4A). Lastly, the cross-sectional views shown in FIGS. 4A-4D do not illustrate actuation of the actuator 202. Cross-sectional views in FIGS. 5A-5B and 6A-6B illustrate actuation of the actuator 202.

For ease of discussion below, the actuator 202 and the gasket 204 are each referred to as having a "top surface" and a "bottom surface," as detailed above with reference to FIGS. 3A-3D.

In FIG. 4A, the elastic substance 206 and the actuator 202 are disposed in the cavity 208. In this arrangement, the cavity 208 houses the actuator 202, meaning that a bottom surface of the actuator 202 and the first surface 212 of the first housing 200 are co-planar (or substantially co-planar). In addition, in some embodiments, the actuator 202 and the opening 211 are substantially concentric with one another. Thus, the actuator 202 may be co-planar with the first surface 212 and flush with the opening 211. Alternatively, in some embodiments, the actuator 202 and the opening 211 are not concentric with one another.

In FIG. 4B, the actuator 202 is not disposed in the cavity 208 (e.g., the elastic substance 206 substantially fills the cavity 206, thereby leaving no room in the cavity 208 for the actuator 202). Instead, the actuator 202 is adjacent and parallel to the cavity 206. More specifically, the actuator 202 is vertically offset from the cavity 208, meaning that (i) a top surface of the actuator 202 and the first surface 212 of the first housing 200 are co-planar (or substantially co-planar), and (ii) a bottom surface of the actuator 202 is vertically offset from the first surface 212 of the first housing 200. In addition, in some embodiments, the actuator 202 and the opening 211 are substantially concentric with one another. Alternatively, in some embodiments, the actuator 202 and the opening 211 are not concentric with one another.

In some embodiments, the actuator 202 is partially disposed in the cavity 208. In this arrangement, the actuator 202 is not flush with the first surface 212 of the first housing 200, and is instead a hybrid of what is shown in FIGS. 4A and 4B.

In FIG. 4C, the elastic substance 206, the gasket 204, and the actuator 202 are disposed in the cavity 208. In this arrangement, the gasket 204 is sandwiched between the elastic substance 206 and the actuator 202. Moreover, the cavity 208 houses the gasket 204 and the actuator 202, and the bottom surface of the actuator 202 and the first surface 212 of the first housing 200 are co-planar (or substantially co-planar). In some embodiments, a diameter of the actuator 202 is less than a diameter of the opening 211, (and in some cases a diameter of the gasket 204). Additionally, in some embodiments, the diameter of the gasket 204 is less than the diameter of the opening 211. As explained above, the gasket 204 may be made from a flexible material, such as rubber.

In FIG. 4D, the cavity 208 is frustoconical in shape and the gasket 204 is disposed in the cavity 208 while the actuator 202 is not disposed in the cavity 208. In this arrangement, the cavity 208 houses the gasket 204, meaning that a bottom surface of the gasket 204 and the first surface 212 of the first housing 200 are co-planar (or substantially co-planar). Moreover, the actuator 202 is vertically offset from the cavity 208, meaning that (i) a top surface of the actuator 202 and the first surface 212 of the first housing 200 are co-planar (or substantially co-planar), and (ii) a bottom surface of the actuator 202 is vertically offset from the first surface 212 of the first housing 200. Thus, in this arrangement, the gasket 204 is flush with the first surface 212 while the actuator 202 is not. Additionally, because the gasket 204 is flexible, the gasket 204 can conform to a shape of the cavity wall(s) (e.g., cavity wall in FIG. 4D is slanted, and a portion of the gasket 204 contacting the cavity wall conforms, at least partially, to the slanted cavity wall).

In some embodiments (not shown), the actuator 202 and the gasket 204 are not disposed in the cavity 208. Instead, the gasket 204 is vertically offset from the cavity 208, meaning that (i) a top surface of the gasket 204 and the first surface 212 of the first housing 200 are co-planar (or substantially co-planar), and (ii) a bottom surface of the gasket 204 is vertically offset from the first surface 212 of the first housing 200. Moreover, the actuator 202 is also vertically offset from the cavity 208. Thus, in this arrangement, the gasket 204 and the actuator 202 are not flush with the first surface 212. Moreover, when the actuator 202 is actuated, the gasket 204 may be forced into the cavity 208 by the actuator 202. Accordingly, in one state, the gasket 204 is not flush with the cavity 208 while in another state the gasket 204 may be flush (or close to flush) with the cavity 208. Moreover, in one state, exterior portions of the gasket 204 (e.g., portions of the gasket 204 that contact wall(s) of the cavity 208) may have a first shape while in the other state the exterior portions may have a second shape (e.g., the gasket 204 conforms to a shape of the cavity wall(s)).

In some embodiments, the actuator 202, the gasket 204, and the opening 211 are substantially concentric with one another. Alternatively, in some embodiments, the gasket 204 and the opening 211 are substantially concentric with one another while the actuator 202 is not concentric with the gasket 204 and the opening 211. For example, a diameter of the actuator 202 may be less than a diameter of the gasket 204 and the opening 211.

FIGS. 5A and 5B illustrate actuation of the actuator included in the fluidic switch, in accordance with some embodiments. In FIGS. 5A and 5B, the actuator 202 is piezoelectric. Moreover, although not shown in FIGS. 5A and 5B, the second housing 300, or some other component of the fluidic device 100, supports the bottom surface of the actuator 202 (e.g., support 906 supports the bottom surface of the actuator 202, FIG. 9). In this way, the bottom surface of the actuator 202 is fixed, and as a result, a force applied by the actuator is focused on the elastic substance 206 (i.e., the actuator's 202 direction of growth is upwards when the actuator 202 is piezoelectric).

In FIG. 5A, the fluidic switch 100 is in a first state 500 (e.g., an open state). When the fluidic switch 100 is in the first state 500, the actuator 202 is not receiving electrical signals.

In FIG. 5B, the fluidic device 100 is in a second state 510 (e.g., a closed state). When in the second state 510, the actuator 202 is receiving electrical signals. Upon receiving the electrical signals, the actuator 202 expands by an amount ($\Delta Z_1$) in at least one dimension (shown as a vertical dimension in FIG. 5B). In doing so, the actuator 202 imparts a force onto the elastic substance 206 and displaces the elastic substance 206 by the amount ($\Delta Z_1$). Displacement of the elastic substance 206 causes a portion 502 of the elastic substance 206 to exit the opening 210, where a volume of the portion 502 substantially equals a volume of the actuator's 202 expansion. Moreover, due to a shape of the cavity 202, a dimension ($\Delta Z_2$) of the portion 502 is greater than the actuator's 202 expansion ($\Delta Z_1$) in the at least one dimension. In this way, a relatively small expansion of the actuator 202 in the at least one dimension causes a sufficiently large portion 502 of the elastic substance 206 to exit the opening 210. The portion 502 of the elastic substance 206 to exit the opening 210 is sometimes referred to herein as the "obstructing portion," and as will be discussed in detail with reference to FIGS. 7A-7B, the obstructing portion 502 impedes transports of a fluid 708 in a channel 702.

Figure 6A:
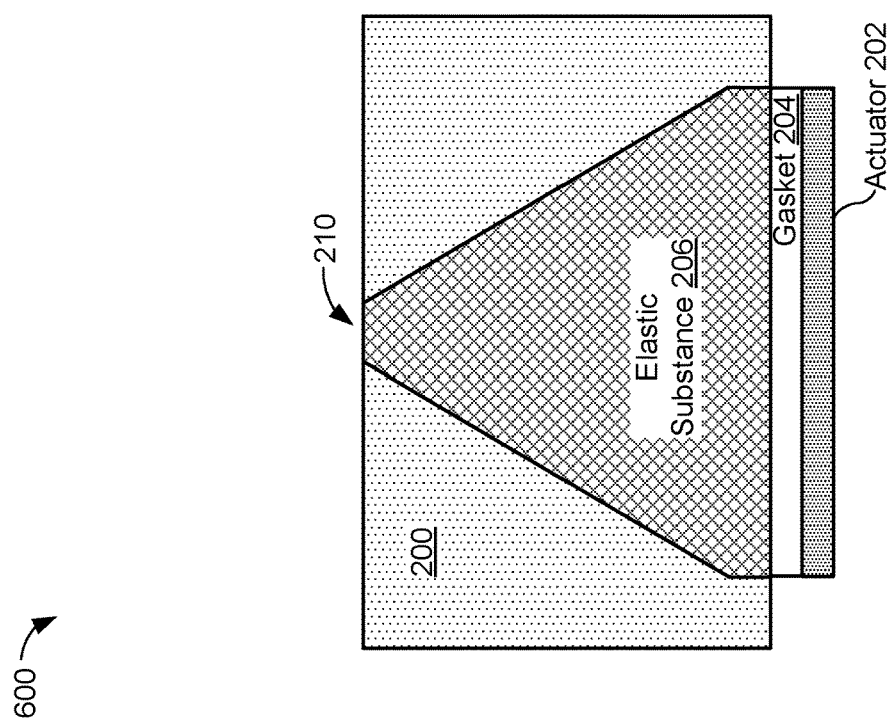

FIGS. 6A and 6B illustrate actuation of the actuator included in the fluidic switch, in accordance with some embodiments. In FIGS. 6A and 6B, the actuator 202 is piezoelectric. Moreover, although not shown in FIGS. 6A and 6B, the second housing 300, or some other component of the fluidic device 100, supports the bottom surface of the actuator 202.

In FIG. 6A, the fluidic switch 100 is in a first state 600 (e.g., an open state). When the fluidic device 100 is in the first state 600, the actuator 202 is not receiving electrical signals.

In FIG. 6B, the fluidic device 100 is in a second state 610 (e.g., a closed state). When in the second state 610, the actuator 202 is receiving electrical signals. Upon receiving the electrical signals, the actuator 202 expands by an amount ($\Delta Z_1$) in at least one dimension (shown as a vertical dimension in FIG. 6B). In doing so, the actuator 202 imparts a force onto the gasket 204, and in turn the elastic substance 206, thereby displacing the gasket 204 and the elastic substance 206 by the amount ($\Delta Z_1$). Displacement of the elastic substance 206 causes a portion 602 of the elastic substance 206 to exit the opening 210, where a volume of the portion 562 substantially equals a volume of the actuator's 202 expansion. Moreover, due the cavity's 202 conical shape, a dimension ($\Delta Z_2$) of the portion 602 is greater than the actuator's 202 expansion ($\Delta Z_1$) in the at least one dimension. In this way, a relatively small expansion of the actuator 202 in the at least one dimension causes a sufficiently large portion 602 of the elastic substance 206 to exit the opening 210.

The descriptions of FIGS. 5A-5B and 6A-6B apply equally to the other arrangements discussed above with reference to FIGS. 3A-4D. However, for the sake of brevity, these descriptions are not provided here. One skilled in the art will appreciate the displacement of the elastic substance 206 in any of the arrangements shown in FIGS. 3A-4D will cause formation of a respective obstructing portion. Moreover, factors effecting size and shape of the obstructing portion include but are not limited to: (i) compressibility of the elastic substance 206, (ii) size and shape of the cavity 208, and (iii) magnitude of the force applied by the actuator 202 (e.g., degree of expansion of the actuator 202).

Figure 7A:
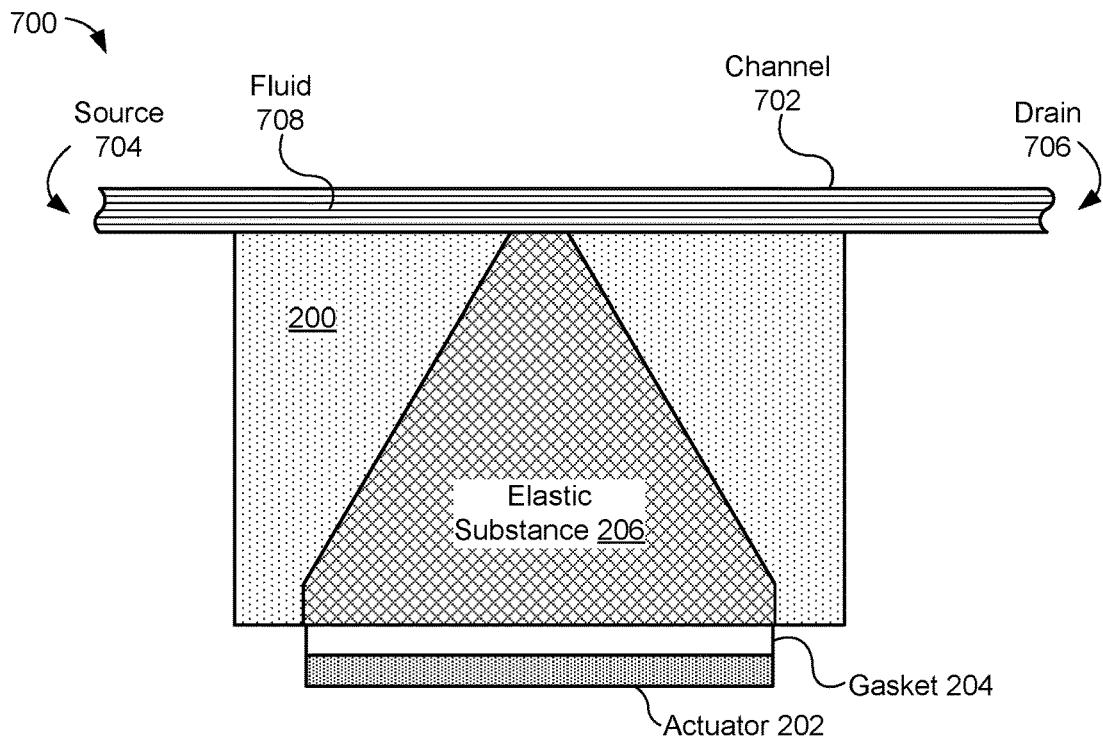
FIGS. 7A-7B illustrate the fluidic switch transitioning from an open state (FIG. 7A) to a closed state (FIG. 7B) in accordance with some embodiments.
Figure 7B:
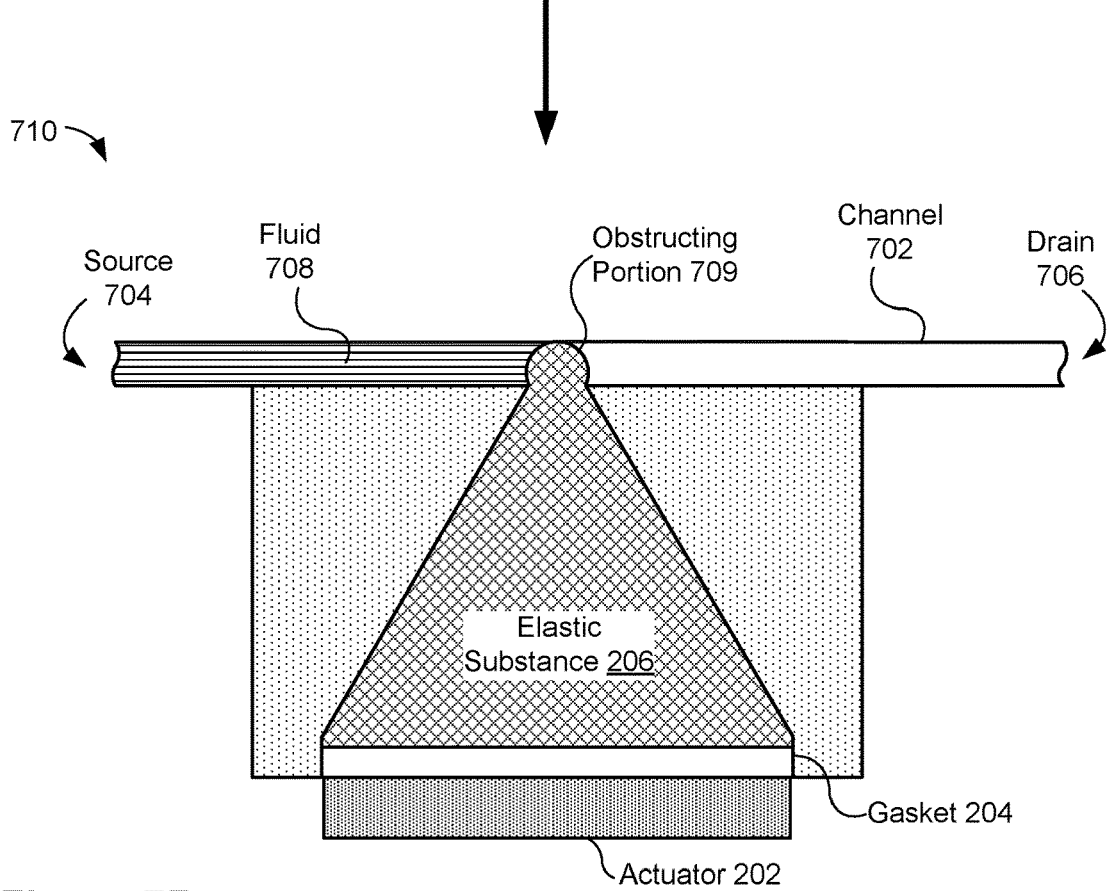

FIGS. 7A-7B illustrate the fluidic switch transitioning from an open state (FIG. 7A) to a closed state (FIG. 7B), in accordance with some embodiments.

In FIGS. 7A-7B, the fluidic switch 100 is shown to include a channel 702. The channel 702 is situated on (e.g., attached to) the second surface 214 of the first housing 200. In some embodiments, the channel 702 is partially attached to the second surface 214 (or a different surface) of the first housing 200. The channel 702 is configured to transport a fluid 708 (e.g., a liquid or gas) from a source 704, across the opening 210, to a drain 706. The channel 702 includes a partition (i.e., an opening) that aligns with the opening 210 of the first housing 200. In this way, the opening 210 opens into the channel 702 and the fluid 708 cannot exit the channel 702 through the opening 210 because the elastic substance 206 is flush with the opening 210 (e.g., as shown in FIGS. 3A-4D)

The channel 702 can be a flexible tube of various shapes, sizes, and materials. For example, the channel 702 may be circular, elliptical, square, rectangular, etc. The channel 702 may be made from a variety of polymers, as known by those skilled in the art. Moreover, a diameter of the channel 702 can range from 50 um to 5 mm (although other ranges are possible). The diameter of the channel 702 is selected to enable an obstructing portion 709 of the elastic substance 206 to impede transport of the fluid 708. For example, if the actuator's 202 expansion ($\Delta Z_1$) is capped at a certain magnitude, then the diameter of the channel 702 is selected based on the magnitude. In another example (in addition to or separate from the previous example), the diameter of the channel 702 is selected based on dimensions of the cavity 208, dimensions of the opening 210, and/or characteristics of the elastic substance 206.

In FIG. 7A, the fluidic device 100 is in a first state 700 (e.g., an open state). When in the first state 700, the actuator 202 of the fluidic device 100 is not receiving electrical signals, and as a result, the fluid 708 is freely transported from the source 704 to the drain 706 (e.g., flow of the fluid 708 satisfies a threshold flow rate).

In FIG. 7B, the fluidic device 100 is in a second state 710 (e.g., a closed state). When in the second state 710, the actuator 202 is receiving signals, and consequently, the actuator 202 expands in at least one dimension (shown as a vertical dimension in FIG. 7B). In doing so, the actuator 202 imparts a force onto the gasket 204, and in turn the elastic substance 206, thereby displacing the gasket 204 and the elastic substance 206 in the at least one dimension. Displacement of the elastic substance 206 causes a portion 709 of the elastic substance 206 to exit the opening 210 and impede transport of the fluid 708 from the source 704 to the drain 706. In some embodiments, the obstructing portion 709 completely blocks transport of the fluid 708 from the source 704 to the drain 706. Alternatively, in some embodiments, the obstructing portion 709 partially impedes (i.e., does not completely block) transport of the fluid 708 from the source 704 to the drain 706. In some embodiments, partial impedance of the fluid 708 is sufficient for the fluidic device 100 to be in the second state 710, while in other embodiments complete blockage of the fluid 708 is needed for the fluidic device 100 to be in the second state.

In some embodiments, a threshold flow rate is set for the fluidic switch 100. Further, when a measured flow of the fluid 708 is greater than the threshold flow rate, the fluidic switch 100 is in the first state 700, and when a measured flow of the fluid 708 is less than or equal to the threshold flow rate, the fluidic switch 100 is in the second state 710. In some embodiments, the threshold flow rate is zero cc/s, while in other embodiments the threshold flow rate is some value greater than zero cc/s. The fluidic switch 100 may include one or more sensors to measure the flow of the fluid 708 in the channel 702.

The descriptions of FIGS. 7A-7B apply equally to the other arrangements discussed above with reference to FIGS. 3A-4D. However, for the sake of brevity, these descriptions are not provided here. One skilled in the art will appreciate the displacement of the elastic substance 206 in any of the arrangements shown in FIGS. 3A-4D will cause formation of a respective obstructing portion.

Figure 8:
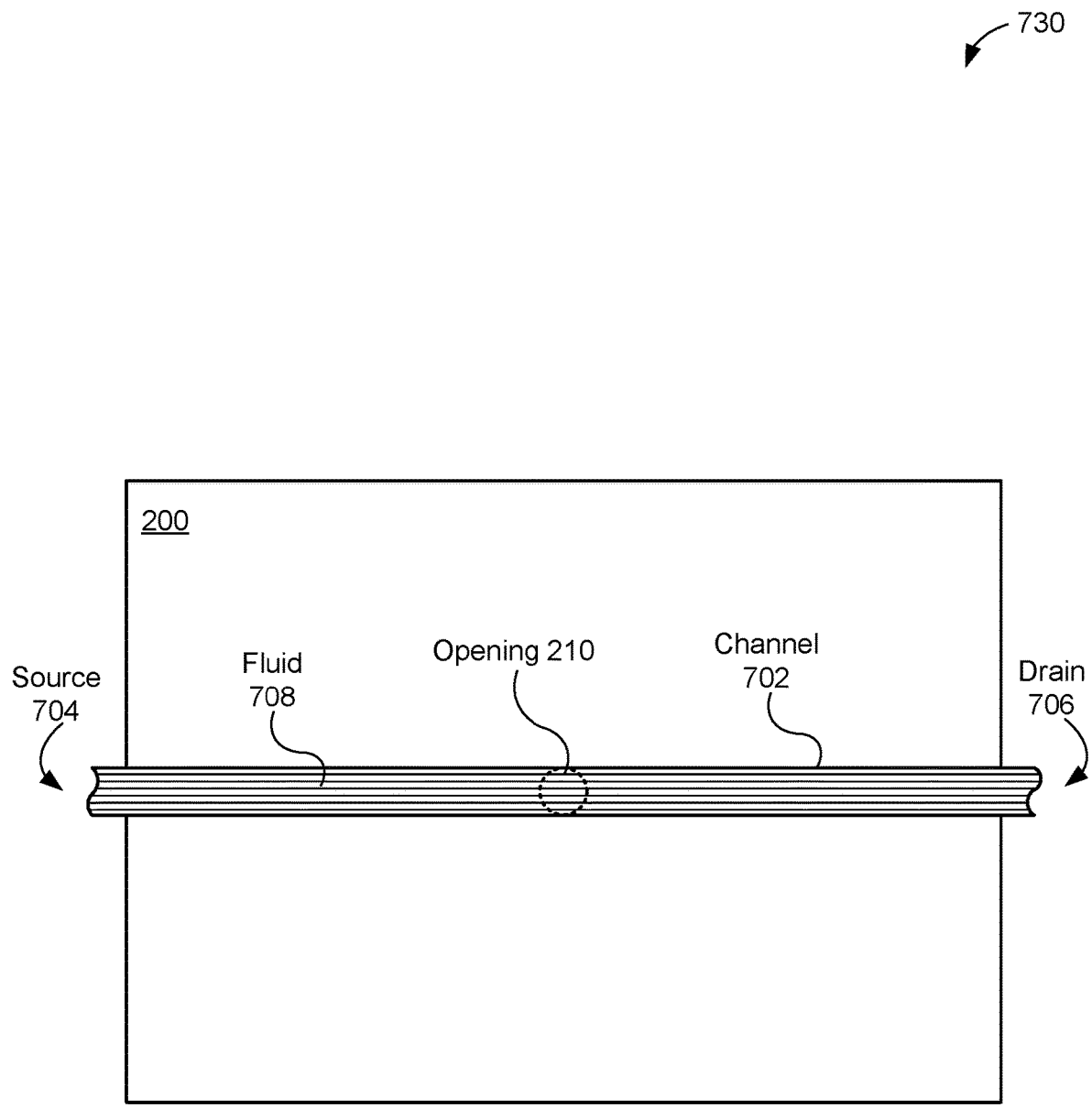
FIG. 8 illustrates a top view of a fluidic switch in an open state in accordance with some embodiments.

FIG. 8 illustrates a top view of the fluidic switch 100 in an open state (FIG. 7A), in accordance with some embodiments. As discussed above with reference to FIG. 7A, the channel 702 is situated on (e.g., attached to) the second surface 214 of the first housing 200. Depending on the application, the channel 702 may be situated at various locations on the second surface 214 (or some other surface) of the first housing 200. Additionally, while the channel 702 is shown straight (i.e., not curved or bowed), in some embodiments the channel 702 may be bowed.

In some embodiments, the first housing 200 includes a plurality of openings (e.g., multiple instances of the opening 210), where each of the plurality of openings opens into a distinct channel (e.g., instances of channel 702). In this way, the fluidic device 100 can act upon at least two different channels by actuating a single actuator (e.g., the elastic substance 206 exits at least two openings and enters two different channels when the actuator 202 is actuated).

FIG. 9 illustrate an example fluidic switch, in accordance with some embodiments. The fluidic switch 900 is an example of the fluidic switch 100 (FIG. 1). For example, the fluidic switch 900 includes a first housing 200, a second housing 300, and a recess 102, as described above with reference to FIG. 1. Additionally, for the sake of illustration, the first and second housings 200, 300 are transparent to show the arrangement of the actuator 202, the gasket 204, and the cavity 208 with respect to the first housing 200, the second housing 300, and the recess 102. The fluidic switch 900 also includes electrical wires 902, optional fasteners 904a-904d, and an optional support 906.

The electrical wires 902 are connected to the actuator 202, and are configured to provide electrical signals to the actuator 202. For example, the electrical wires 902 may also be connected to a controller, or some other device that controls operation of the actuator 202 (e.g., processor(s) 1370, FIG. 13). The controller (or other device) is configured to provide the electrical signals to the actuator 202 via the electrical wires 902. In some embodiments, the electrical wires 902 are conductive traces. In this way, the fluidic switch 900 can be miniaturized.

The optional fasteners 904a-904d are configured to secure the first housing 200 with the second housing 300. The arrangement and type of fastener shown in FIG. 9 is merely one example, and various other arrangements and fastener types may be used. For example, chemical fasteners, such as an adhesive, may be used (e.g., an adhesive can be disposed between the first housing 200 with the second housing 300).

The optional support 906 contacts a surface of the actuator 202, and is configured to hold the actuator 202 in place. In this arrangement, the surface of the actuator 202 contacting the support 906 is essentially fixed, and as a result, a force applied by the actuator 202 is focused on the elastic substance 206 (i.e., direction of growth is upwards towards the elastic substance 206 when the actuator 202 is piezoelectric, as opposed to downwards towards the support 906). It is noted that various other components could be used to support the actuator 202. As one example, the recess 102 may be sized to receive and secure the actuator 202 below the cavity 208. Further, in some embodiments, a plug (e.g., a removable piece of plastic, metal, etc.) may be fitted into the recess 102 after the actuator 102 is received by the recess 102. The plug, once fitted into the recess 102 (i.e., removably secured), would prevent the actuator 202 from sliding out of the recess 102, e.g., if the fluidic switch is tilted/rotated.

FIG. 10 is a cross-section view 1000 of the fluidic switch 900, in accordance with some embodiments (taken along $B^1$-$B^2$, FIG. 9). As shown, the fluidic switch 900 includes holes 1002a and 1002b that extend through the first and second housings 200, 300. The holes 1002a and 1002b are configured to receive the fasteners 902a-902b. It is noted that the holes 1002a and 1002b are optional, and are not included when mechanical fasteners are not used (i.e., a chemical fastener is used). The cross-section view 1010 also shows the optional support 906 contacting the surface of the actuator 202. The support 906, in some embodiments, does not extend out of the second housing 300, and instead the support 906 is flush with the second housing 300. Further, an end of the support 906 not contacting the actuator 202 may include an adjustment portion that allows a user to adjust a position of the support 906 (or completely remove the support). The adjustment portion may be, for example, an indentation to receive a tool, such as a screw driver or other wrench.

In some embodiments, portions of the holes 1002a and 1002b in the first housing 200 have a first diameter and portions of the holes 1002a and 1002b in the second housing 300 have a second diameter. The first and second diameters may be the same or they may differ. Moreover, the description of the holes 1002a and 1002b applies to holes 1002c and 1002d, shown in FIG. 11 below.

Figure 11:
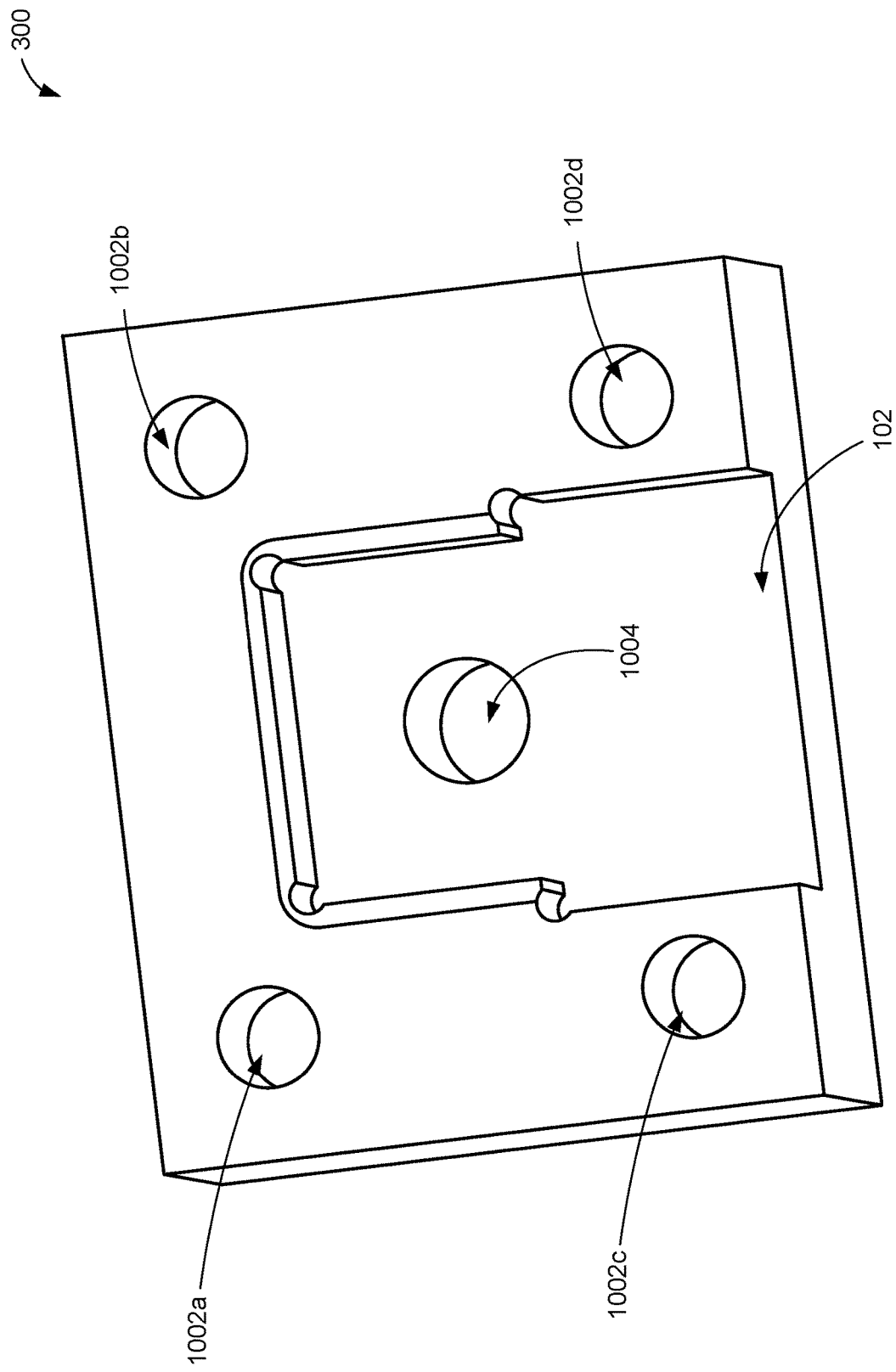
FIG. 11 is an oblique view of a housing of a fluidic switch in accordance with some embodiments.

FIG. 11 is an oblique view of the second housing 300 discussed above with reference to FIG. 1, in accordance with some embodiments. The first housing 200 is not included in FIG. 11 for ease of illustration and discussion. In this example, the second housing 300 defines the recess 102 and also a through hole 1004 configured to receive the optional support 906. However, the through hole 1004 is not part of the second housing 300 in those embodiments not including the support 906. Moreover, the holes 1002a, 1002b, 1002c, and 1002d are also optional.

Figure 12:
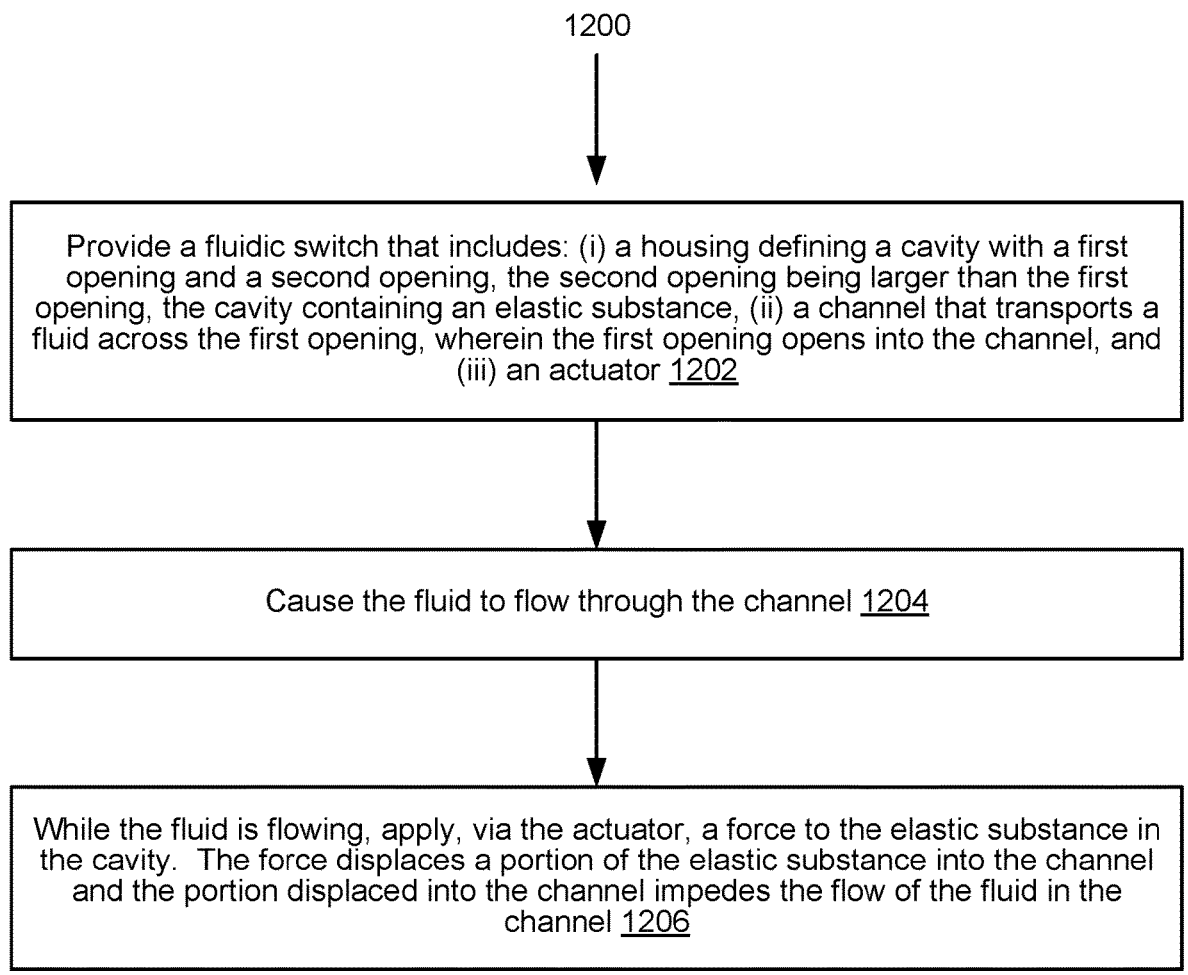
FIG. 12 is a flow diagram illustrating a method of switching a fluidic switch in accordance with some embodiments.

FIG. 12 is a flow diagram illustrating a method 1200 of switching a fluidic switch in accordance with some embodiments. The steps of the method 1200 may be performed by a fluidic switch (e.g., a fluidic switch 100, FIG. 1), or a controller that controls operation of the fluidic switch 100.

The method 1200 includes providing (1202) a fluidic switch (e.g., fluidic switch 100, FIG. 1) that includes a housing (e.g., first housing 200, FIG. 1) defining a cavity (e.g., cavity 208, FIG. 3A-4D) with a first opening (e.g., opening 210, FIG. 2C) and a second opening (opening 211, FIG. 2A), the second opening being larger than the first opening, the cavity containing an elastic substance (e.g., a viscoelastic substance). In some embodiments, a cross-sectional area of the cavity decreases from the second opening to the first opening. Further, in some embodiments, the cavity is substantially frustoconical, e.g., as shown in FIGS. 4A-4D.

The fluidic switch further includes a channel (e.g., channel 702, FIGS. 7A-7B and FIG. 8) that transports a fluid (e.g., fluid 708) across the first opening, where the first opening opens into the channel. One end of the channel may connect to a source (e.g., source 704) and another end of the channel may connect to a drain (e.g., drain 706). The fluid may be a liquid or a gas (e.g., water, deionized water, alcohol, oil, standard hydraulic fluids, air, nitrogen, or the like).

The fluidic switch further includes an actuator (e.g., actuator 202, FIG. 2A). In some embodiments, the actuator is disposed in the cavity, e.g., as shown in FIG. 3A, or partially disposed in the cavity. Alternatively, in some embodiments, the actuator is adjacent and parallel to the cavity, e.g., as shown in FIG. 3B.

In some embodiments, the fluidic switch includes a second housing (e.g., second housing 300, FIG. 1) connected to the first housing. The second housing is configured to support the actuator included in the fluidic switch. The second housing may be adjacent to the second opening. The second housing may include a recess (e.g., recess 102, FIG. 1) configured to accommodate one or more electrical wires connected to the actuator.

In some embodiments, the fluidic switch includes a gasket (e.g., gasket 204, FIG. 2A) disposed between the actuator and the elastic substance. The gasket may be configured to seal the second opening of the cavity. The gasket may be sized such that is fits within the second opening (e.g., a diameter of the gasket may substantially match a diameter of the second opening).

The method 1200 further includes causing (1204) the fluid to flow through the channel. The fluid may be pressurized and/or connected to one or more pumps (or some other device) that cause the fluid to flow through the channel. The pressurized fluid may be analogous to a rail voltage for a transistor in an electrical system, such that fluid flows away from a high pressure area (e.g., the source) toward areas with lower pressure (e.g., the drain) much in the same way that a rail voltage provide potential for other parts of an electrical circuit. A typical operating pressure of the fluid in the high pressure area can be 1-100 pounds per square inch. An example of the fluid flowing through the channel unimpeded is provided in FIGS. 7A and 7C.

The method 1200 further includes, while the fluid is flowing, applying (1206), via the actuator, a force to the elastic substance in the cavity, where the force displaces a portion of the elastic substance into the channel. For example, with reference to FIG. 7B, the actuator 202 imparts a force onto the gasket 204, and in turn the elastic substance 206, thereby displacing the gasket 204 and the elastic substance 206 vertically. Displacement of the elastic substance 206 causes a portion 709 of the elastic substance 206 to exit the opening 210 and impede transport of the fluid 708 from the source 704 to the drain 706. Accordingly, the fluidic switch switches from a first state (e.g., open state shown in FIG. 7A) to a second state (e.g., closed state shown in FIG. 7B).

In some embodiments, the actuator is electrically connected to a controller (e.g., one or more processors 1370, FIG. 13; controller 1430, FIG. 14), and the method 1200 further includes receiving an electrical signal from the controller. Upon receiving the electrical signal, the actuator applies the force to the elastic substance in the cavity. In some embodiments, the electrical signal corresponds to data displayed by a head-mounted display (e.g., head-mounted display 1310, FIG. 13), and when the fluidic switch switches to the second state, a haptic stimulation is applied to a user of the head-mounted display.

In some embodiments, the method 1200 further includes ceasing to apply the force to the elastic substance (e.g., the actuator ceases to receive the electrical signal). Upon ceasing to apply the force, the elastic substance retracts from the channel back into the cavity. In doing so, the fluidic switch switches from the second state back to the first state.

Figure 13:
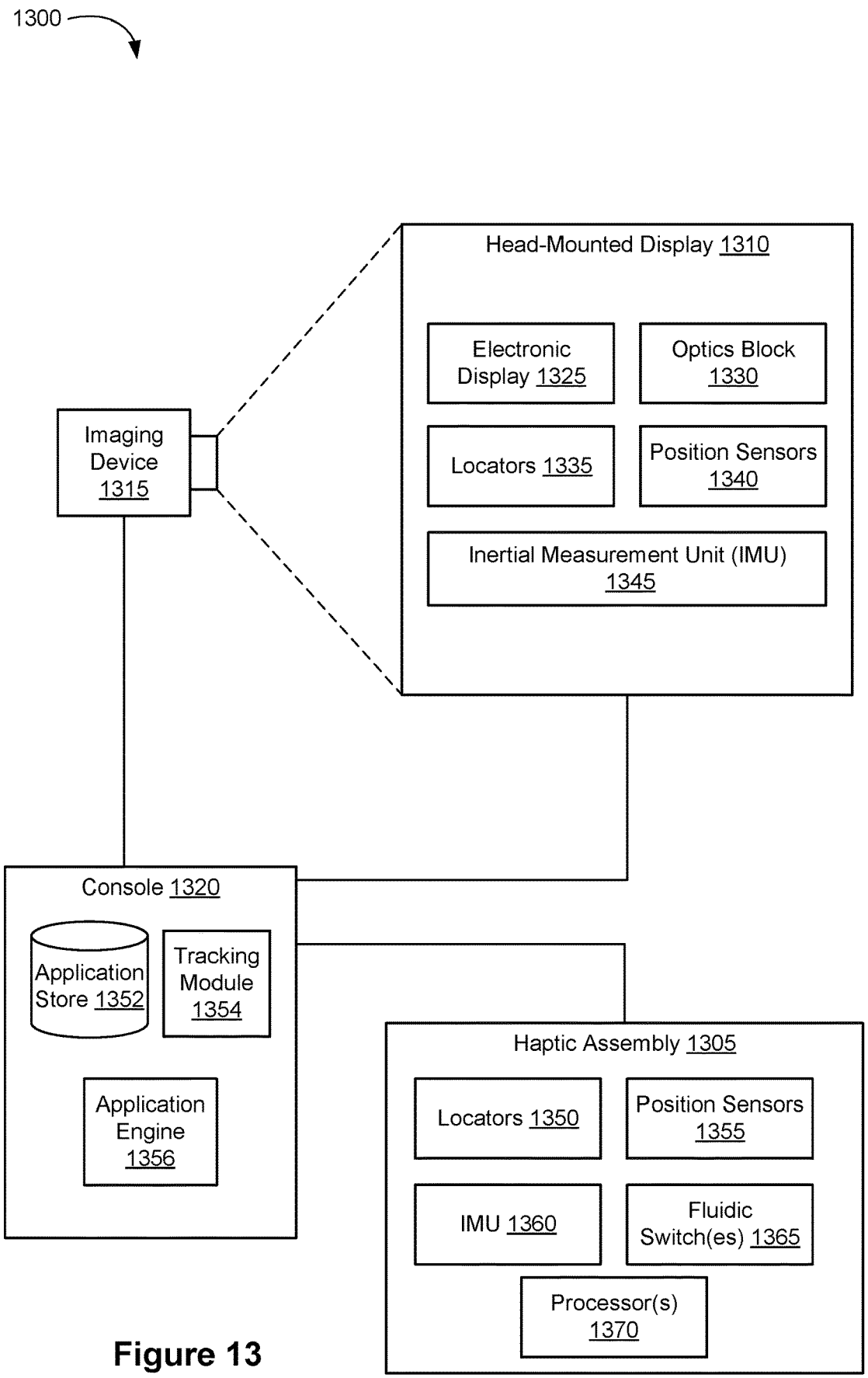
FIG. 13 is a block diagram illustrating an exemplary system in accordance with some embodiments.

FIG. 13 is a block diagram illustrating a system 1300, in accordance with various embodiments. The system 1300 may be a virtual reality (VR) system, an augmented reality (AR) system, a mixed reality (MR) system, or some combination thereof. The system 1300 may utilize one or more of the fluidic switches depicted in FIG. 1-11, as further described below. The system 1300 comprises a head-mounted display (HMD) 1310, an imaging device 1315, and a haptic assembly 1305 that are each in communication with a console 1320 (e.g., wired connection and/or wireless connection). While FIG. 13 shows an example system 1300 including one HMD 1310, one imaging device 1315, and one haptic assembly 1305, in some embodiments any number of these components may be included in the system 1300.

The HMD 1310 includes an electronic display 1325, an optics block 1330, one or more locators 1335, one or more position sensors 1340, and one or more inertial measurement units (IMU) 1345. The electronic display 1325 displays 2D or 3D images to the user in accordance with data received from the console 1320. The optics block 1330 magnifies received light from the electronic display 1325, corrects optical errors associated with the image light, and the corrected image light is presented to a user of the HMD 1310. An optical element may be an aperture, a Fresnel lens, a convex lens, a concave lens, a filter, or any other suitable optical element that affects the image light emitted from the electronic display 1325.

The locators 1335 are objects located in specific positions on the HMD 1310 relative to one another and relative to a specific reference point on the HMD 1310. A locator 1335 may be a light emitting diode (LED), a corner cube reflector, a reflective marker, a type of light source that contrasts with an environment in which the HMD 1310 operates, or some combination thereof.

The IMU 1345 is an electronic device that generates first calibration data based on measurement signals received from one or more of the position sensors 1340. A position sensor 1340 generates one or more measurement signals in response to motion of the HMD 1310. Examples of position sensors 1340 include: one or more accelerometers, one or more gyroscopes, one or more magnetometers, another suitable type of sensor that detects motion, a type of sensor used for error correction of the IMU 1345, or some combination thereof. The position sensors 1340 may be located external to the IMU 1345, internal to the IMU 1345, or some combination thereof. Based on the one or more measurement signals from one or more position sensors 1340, the IMU 1345 generates first calibration data indicating an estimated position of the HMD 1310 relative to an initial position of the HMD 1310.

The IMU 1345 receives one or more calibration parameters from the console 1320. As further discussed below, the one or more calibration parameters are used to maintain tracking of the HMD 1310. Based on a received calibration parameter, the IMU 1345 may adjust one or more IMU parameters (e.g., sample rate). In some embodiments, certain calibration parameters cause the IMU 1345 to update an initial position of the reference point so it corresponds to a next calibrated position of the reference point. Updating the initial position of the reference point as the next calibrated position of the reference point helps reduce accumulated error associated with the determined estimated position.

The imaging device 1315 generates second calibration data in accordance with calibration parameters received from the console 1320. Second calibration data includes one or more images showing observed positions of the locators 1335 that are detectable by the imaging device 1315. The imaging device 1315 may include one or more cameras, one or more video cameras, any other device capable of capturing images including one or more of the locators 1335, or some combination thereof. The imaging device 1315 is designed to detect light emitted or reflected from locators 1335 in a field of view of the imaging device 1315. In embodiments where the locators 1335 include passive elements (e.g., a retroreflector), the imaging device 1315 may include a light source that illuminates some or all of the locators 1335, which retro-reflect the light towards the light source in the imaging device 1315. Second calibration data is communicated from the imaging device 1315 to the console 1320 (e.g., via a wire or wirelessly), and the imaging device 1315 receives one or more calibration parameters from the console 1320 to adjust one or more imaging parameters (e.g., focal length, focus, frame rate, ISO, sensor temperature, shutter speed, aperture, etc.).

The haptic assembly 1305 provides haptic feedback including a perception of contacting a virtual object. In some embodiments, the haptic assembly 1305 includes a plurality of composable fluidic switches 1365 (e.g., instances of the fluidic switch 100), which may form one or more composite fluidic devices. The composite fluidic devices may be used to, e.g., address actuators included in the haptic assembly 1305 according to the haptic feedback signal from the console 1320 and/or one or more processors 1370. In some embodiments, the composable fluidic switches 1365 are controlled by the one or more processors 1370. In some embodiments, as more fully described below in FIG. 14, the haptic assembly 1305 is a haptic glove 1400 through which the console 1320 enables a user to interact with a virtual object.

In FIG. 13, the haptic assembly 1305 further includes locators 1350, one or more position sensors 1355, and an inertial measurement unit (IMU) 1360. In some embodiments, the locators 1350, one or more position sensors 1355, and an inertial measurement unit (IMU) 1360 are installed to determine a physical position or movement of the haptic assembly 1305. In addition, the haptic assembly 1305 receives, from the console 1320, a haptic feedback signal corresponding to haptic feedback to the user. The haptic assembly 1305 provides the user with the haptic feedback of touching a virtual object in a virtual space, according to the haptic feedback signal. Specifically, the haptic assembly 1305 prevents or enables a physical movement of a portion of a user in contact with the virtual object in the virtual space. For example, if a user's finger is in contact with a virtual object (e.g., a virtual wall) in a virtual space, the haptic assembly 1305 prevents a physical movement of the user's finger in a direction through the virtual object in the virtual space. Accordingly, the user can receive a perception of contacting the virtual object.

In some embodiments, the haptic feedback signal indicates a position or a portion of the haptic assembly 1305 to be actuated, and an amount of actuation of the position or the portion of the haptic assembly 1305 for providing haptic feedback. The amount of actuation may be determined by, e.g., the console 1320 and/or the one or more processors 1370, according to a virtual position of the haptic assembly 1305 corresponding to a physical position of the haptic assembly 1305 and a virtual position of a virtual object in a virtual space. The haptic assembly 1305 provides tactile perception of a user touching the virtual object according to the amount of actuation indicated by the haptic feedback signal.

The locators 1350 are objects located in specific positions on the haptic assembly 1305 relative to one another and relative to a specific reference point of the haptic assembly 1305. A locator 1350 is substantially similar to a locator 1335 except that a locator 1350 is part of the haptic assembly 1305.

A position sensor 1355 generates one or more measurement signals in response to motion of the haptic assembly 1305. The position sensors 1355 are substantially similar to the positions sensors 1340, except that the position sensors 1355 are part of the haptic assembly 1305.

Based on the one or more measurement signals from one or more position sensors 1355, the IMU 1360 generates first calibration data of the haptic assembly 1305 indicating an estimated position of the haptic assembly 1305 relative to an initial position of the haptic assembly 1305. For example, the position sensors 1355 include multiple accelerometers to measure translational motion (forward/back, up/down, left/right) and multiple gyroscopes to measure rotational motion (e.g., pitch, yaw, roll) of the haptic assembly 1305.

The IMU 1360 receives one or more calibration parameters of the haptic assembly 1305 from the console 1320. As further discussed below, the one or more calibration parameters of the haptic assembly 1305 are used to maintain tracking of the haptic assembly 1305. Based on a received calibration parameter of the haptic assembly 1305, the IMU 1360 may adjust one or more IMU parameters (e.g., sample rate). In some embodiments, certain calibration parameters of the haptic assembly 1305 cause the IMU 1360 to update an initial position of the reference point of the haptic assembly 1305 so it corresponds to a next calibrated position of the reference point of the haptic assembly 1305.

The console 1320 provides media to the HMD 1310 for presentation to the user in accordance with information received from one or more of: the imaging device 1315, the HMD 1310, and the haptic assembly 1305. In the example shown in FIG. 13, the console 1320 includes an application store 1352, a tracking module 1354, and an engine 1356. Some embodiments of the console 1320 have different modules than those described in conjunction with FIG. 13. Similarly, the functions further described below may be distributed among components of the console 1320 in a different manner than is described here.

The application store 1352 stores one or more applications for execution by the console 1320. An application is a group of instructions, that when executed by a processor, generates content for presentation to the user. Content generated by an application may be in response to inputs received from the user via movement of the HMD 1310 or the haptic assembly 1305. Examples of applications include: gaming applications, conferencing applications, audio/video/media playback applications, or other suitable applications.

The tracking module 1354 calibrates the imaging device 1315 using one or more calibration parameters and may adjust one or more calibration parameters to reduce error in determination of the position of the HMD 1310. The tracking module 1354 tracks movements of the HMD 1310 using second calibration information from the imaging device 1315. The tracking module 1354 determines positions of a reference point of the HMD 1310 using observed locators from the first calibration information and a model of the HMD 1310. The tracking module 13754 also determines positions of a reference point of the HMD 1310 using position information from the second calibration information.

The engine 1356 executes applications and receives position information, acceleration information, velocity information, predicted future positions, or some combination thereof of the HMD 1310 from the tracking module 1354. Based on the received information, the engine 1356 determines content to provide to the HMD 1310 for presentation to the user. For example, if the received information indicates that the user has looked to the left, the engine 1356 generates content for the HMD 1310 that mirrors the user's movement in a virtual environment.

Figure 14:
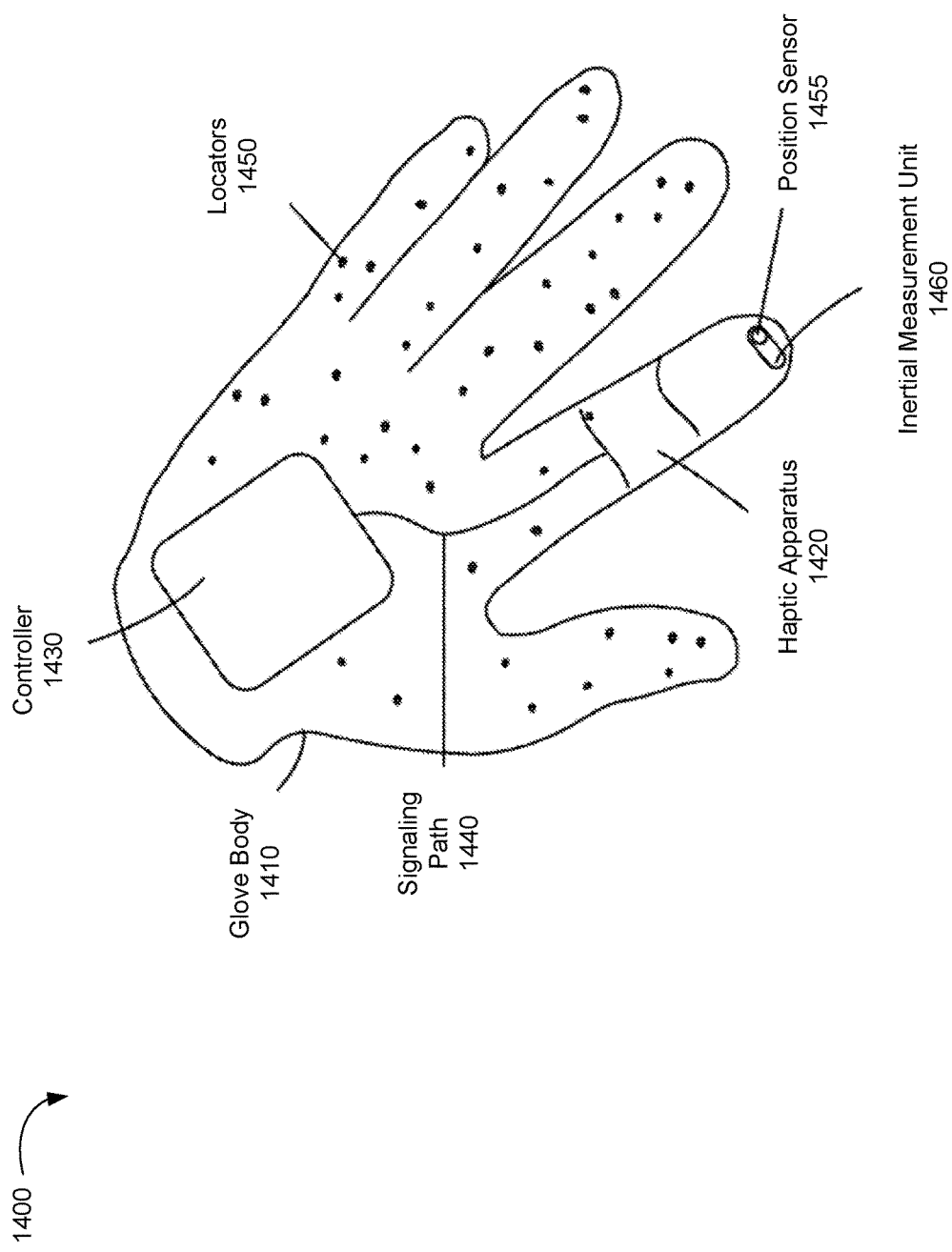
FIG. 14 illustrates an example haptic glove for interacting with virtual objects in accordance with some embodiments.

FIG. 14 is an example haptic glove 1400 for interacting with virtual objects, in accordance with some embodiments. The haptic glove 1400 shown in FIG. 14 includes a glove body 1410, a haptic apparatus 1420, a controller 1430, a signaling path 1440, one or more locators 1450, a position sensor 1455, and an IMU 1460. Only one signaling path 1440, one haptic apparatus 1420, one position sensor 1455 and one IMU 1460 are shown in FIG. 14 to simplify the description. In some embodiments, however, the haptic glove 1400 can include multiple signaling paths, position sensors, and haptic apparatus that are connected to the controller 1430 (e.g., for each finger of the haptic glove 1400, a set of haptic apparatus, position sensors and IMUs may be connected to the controller).

In some embodiments, the position sensor 1455 is coupled to a corresponding finger of the glove body 1410 (e.g., a portion corresponding to a fingertip of the glove body), the haptic apparatus 1420 is coupled to a corresponding finger portion (e.g., a portion corresponding to a joint between two phalanges) of the glove body 1410, and the controller 1430 is coupled to a portion of the glove body 1410 corresponding to a back of a hand (i.e., dorsal side). The signaling path 1440 is coupled between the controller 1430 and the haptic apparatus 1420. In some embodiments, one or more of these components are placed beneath an outer surface of the glove body 1410, thus are not visible from the outside. Alternatively or in addition, some of these components may be placed on an outer surface of the glove body 1410, and are visually detectable. In some embodiments, the haptic glove 1400 may be the haptic assembly 1405 shown in FIG. 14 and the locators 1450, the position sensor 1455 and the IMU 1460 of the haptic glove 1400 may be the corresponding locators 1350, position sensors 1355, and IMUs 1345 of the haptic assembly 1405 shown in FIG. 13.

The haptic apparatus 1420 provides haptic feedback including a perception of a user touching a virtual object. In some embodiments, the haptic apparatus 1420 is actuated according to instructions received from the controller 1430. The haptic apparatus 1420 may be coupled to a portion corresponding to a joint between two phalanges of the glove body 1410. Alternatively or in addition, the haptic apparatus 1420 may be the entire glove body 1410 or may be placed on other parts (e.g., an area corresponding to a joint between two different fingers) of the glove body 1410. The haptic apparatus 1420 may be, for example, a plurality of actuators. It is further noted that although a glove is illustrated, various other articles or devices can incorporate the haptic assembly discussed herein.

The controller 1430 provides instructions to the haptic apparatus 1420 to perform specific functions. In some embodiments, the controller 1430 may receive instructions or haptic feedback from the console 1320 and actuates the haptic apparatus 1420 accordingly. In some embodiments, the controller 1430 is part of the one or more processors 1370. The controller 1430 may include (or be in communication with) a plurality of fluidic switches, such as the fluidic switches 100 depicted in FIGS. 1-11, which generate instructions for one or more haptic apparatuses (e.g., actuators). As discussed above with regards to FIGS. 1 and 13, the fluidic switches 100 are composable and may be coupled together to form composite fluidic devices, like, e.g., a decoder. Decoders, for example, can help reduce a number of logical connections within the controller 1430 and/or connections to the haptic apparatus 1420. Accordingly, the controller 1430 may be composed of a plurality of fluidic switches 100.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A fluidic switch comprising:
    a housing defining a cavity with a first opening and a second opening, the second opening being larger than the first opening, the cavity containing an elastic substance;
    a channel to transport a fluid from a source, across the first opening, to a drain, wherein the first opening opens into the channel; and
    an actuator to apply a force through the second opening to the elastic substance in the cavity when actuated, the force to displace a portion of the elastic substance into the channel to impede transport of the fluid through the channel.

2. The fluidic switch of claim 1, wherein the portion of the elastic substance is to retract from the channel back into the cavity when the actuator ceases to apply the force.

3. The fluidic switch of claim 1, wherein:
the actuator is electrically connected to a controller to receive electrical signals from the controller; and
the actuator is to apply and remove the force in response to the electrical signals.

4. The fluidic switch of claim 3, wherein the actuator is piezoelectric.

5. The fluidic switch of claim 3, wherein the electrical signals correspond to data displayed by a head-mounted display.

6. The fluidic switch of claim 1, wherein a cross-sectional area of the cavity decreases from the second opening to the first opening.

7. The fluidic switch of claim 6, wherein the cavity is substantially frustoconical.

8. The fluidic switch of claim 1, further comprising a gasket, disposed between the actuator and the elastic substance, to seal the second opening of the cavity.

9. The fluidic switch of claim 8, wherein the gasket is an O-ring.

10. The fluidic switch of claim 1, wherein the elastic substance is an elastic polymer.

11. The fluidic switch of claim 1, wherein:
the first opening is situated on a first side of the housing; and
at least a portion of the channel is situated on the first side of the housing.

12. The fluidic switch of claim 1, wherein the actuator is disposed in the second opening.

13. A method of switching a fluidic switch, comprising:
providing a fluidic switch that comprises:
a housing defining a cavity with a first opening and a second opening, the second opening being larger than the first opening, the cavity containing an elastic substance;
a channel that transports a fluid across the first opening, wherein the first opening opens into the channel; and
an actuator;
causing the fluid to flow through the channel; and
while the fluid is flowing, applying, via the actuator, a force to the elastic substance in the cavity, wherein the force displaces a portion of the elastic substance into the channel,
wherein the portion of the elastic substance displaced into the channel impedes the flow of the fluid in the channel.

14. The method of claim 13, further comprising ceasing to apply the force to the elastic substance by the actuator,
wherein the portion of the elastic substance displaced into the channel retracts back into the cavity when the actuator ceases to apply the force.

15. The method of claim 13, wherein:
the actuator is electrically connected to a controller;
the method further comprises receiving an electrical signal from the controller; and
applying the force to the elastic substance is performed in response to receiving the electrical signal.

16. The method of claim 15, wherein the electrical signal corresponds to data displayed by a head-mounted display.

17. The method of claim 13, wherein a cross-sectional area of the cavity decreases from the second opening to the first opening.

18. The method of claim 17, wherein the cavity is substantially frustoconical.

19. The method of claim 13, wherein the actuator is piezoelectric.

20. The method of claim 13, wherein the elastic substance is an elastic polymer.

* * * * *